United States Patent
Nakasu et al.

(10) Patent No.: US 8,965,113 B2
(45) Date of Patent: Feb. 24, 2015

(54) RECOGNITION APPARATUS, METHOD, AND COMPUTER PROGRAM PRODUCT

(75) Inventors: Toshiaki Nakasu, Tokyo (JP); Hidetaka Ohira, Tokyo (JP); Tsukasa Ike, Toyko (JP); Ryuzo Okada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 368 days.

(21) Appl. No.: 13/418,890

(22) Filed: Mar. 13, 2012

(65) Prior Publication Data

US 2013/0027300 A1 Jan. 31, 2013

(30) Foreign Application Priority Data

Jul. 29, 2011 (JP) ................................. 2011-167608

(51) Int. Cl.
*G06F 3/01* (2006.01)
*G06F 3/0485* (2013.01)
*G06F 3/0484* (2013.01)
(52) U.S. Cl.
CPC .............. *G06F 3/017* (2013.01); *G06F 3/0485* (2013.01); *G06F 3/04842* (2013.01)
USPC .......................................... 382/158; 382/103

(58) Field of Classification Search
None
See application file for complete search history.

(56) References Cited

FOREIGN PATENT DOCUMENTS

JP 2005-352531 12/2005

*Primary Examiner* — Tsung-Yin Tsai
(74) *Attorney, Agent, or Firm* — Finnegan, Henderson, Farabow, Garrett & Dunner, L.L.P.

(57) ABSTRACT

In an embodiment, a recognition apparatus includes an obtaining unit, a calculating unit, a principal axis selecting unit, a turning point setting unit, a section setting unit, and a determining unit. The obtaining unit obtains positions of a specific part in a coordinate system having a first axis to an n-th axis (n≥2). The calculating unit calculates a movement vector of the specific part. The principal axis selecting unit selects a principal axis. The turning point setting unit sets a position at which there is a change in the principal axis and sets a position at which there is a change. The section setting unit sets a determination target section, and sets a previous section. The determining unit calculates an evaluation value of the determination target section and an evaluation value of the immediately previous section and determines which of the first axis to the n-th axis is advantageous.

6 Claims, 23 Drawing Sheets

FIG.7
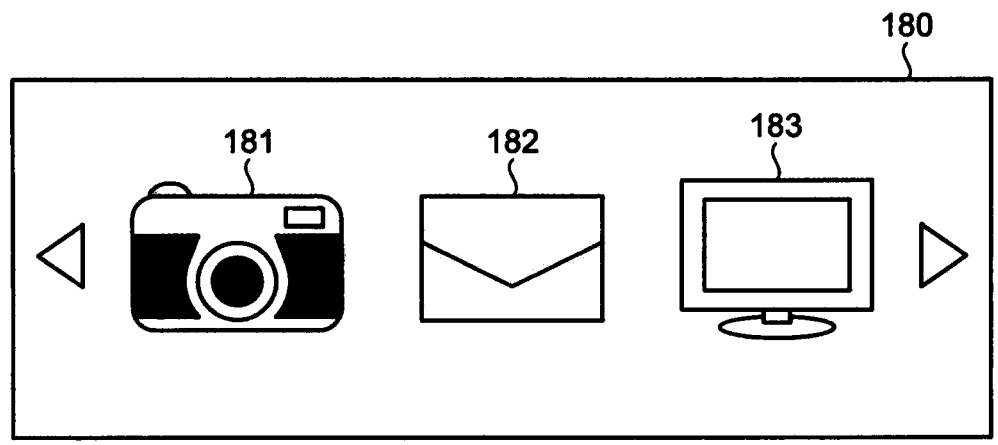
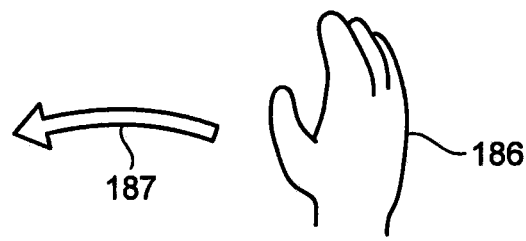
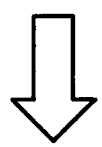
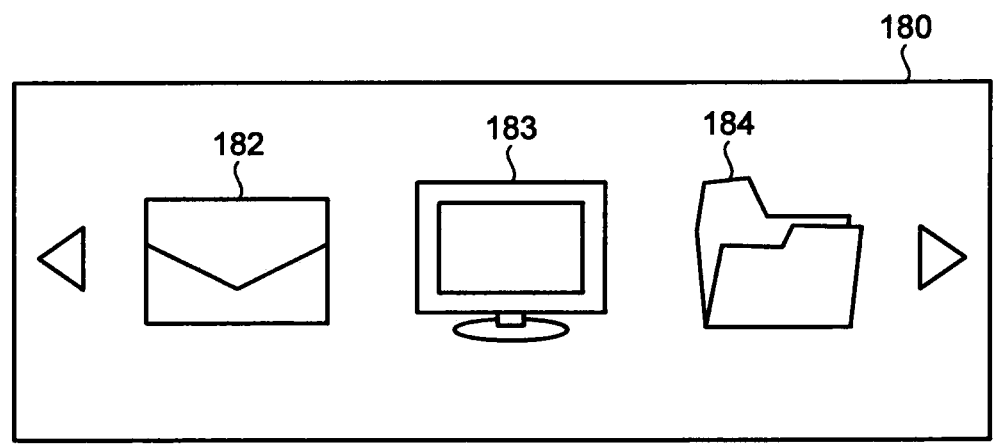

FIG.13

| TIMING | PROGRESS RATE | ADVANTA-GEOUS AXIS |
|--------|---------------|--------------------|
| $T_i$ | 0 | FIRST AXIS |
| $T_i+10$ | 0.15 | FIRST AXIS |
| $T_i+20$ | 0.30 | FIRST AXIS |
| $T_i+30$ | 0.45 | SECOND AXIS |
| ⋮ | ⋮ | ⋮ |
| $T_i+60$ | 0.90 | SECOND AXIS |
| $T_i+70$ | 1.00 | SECOND AXIS |

FIG.14

| TIMING | PROGRESS RATE | ADVANTA-GEOUS AXIS | DESIRED DETERMINATION TIMING |
|---|---|---|---|
| $T_i$ | 0 | FIRST AXIS | $T_i$ |
| $T_i+10$ | 0.15 | FIRST AXIS | $T_i$ |
| $T_i+20$ | 0.30 | FIRST AXIS | $T_i$ |
| $T_i+30$ | 0.45 | SECOND AXIS | $T_i$ |
| ⋮ | ⋮ | ⋮ | ⋮ |
| $T_i+60$ | 0.90 | SECOND AXIS | $T_i$ |
| $T_i+70$ | 1.00 | SECOND AXIS | $T_i$ |
| $T_i+80$ | 0 | SECOND AXIS | $T_i+80$ |
| $T_i+90$ | 0.15 | SECOND AXIS | $T_i+80$ |
| ⋮ | ⋮ | ⋮ | ⋮ |
| $T_i+140$ | 0.90 | SECOND AXIS | $T_i+80$ |
| $T_i+150$ | 1.00 | SECOND AXIS | $T_i+80$ |
| $T_i+160$ | 0 | SECOND AXIS | $T_i+160$ |
| $T_i+170$ | 0.15 | SECOND AXIS | $T_i+160$ |
| ⋮ | ⋮ | ⋮ | ⋮ |

FIG.23

| TIMING | PROGRESS RATE | ADVANTAGEOUS DIRECTION |
|---|---|---|
| $T_i$ | 0 | - |
| $T_i+10$ | 0 | - |
| $T_i+20$ | 0 | LEFTWARD |
| $T_i+30$ | 0.15 | LEFTWARD |
| ⋮ | ⋮ | ⋮ |
| $T_i+80$ | 0.90 | LEFTWARD |
| $T_i+90$ | 1.00 | LEFTWARD |
| $T_i+100$ | 0 | - |
| ⋮ | ⋮ | ⋮ |
| $T_i+130$ | 0 | - |
| $T_i+140$ | 0 | RIGHTWARD |
| $T_i+150$ | 0.15 | RIGHTWARD |
| $T_i+160$ | 0 | LEFTWARD |
| $T_i+170$ | 0.15 | LEFTWARD |
| ⋮ | ⋮ | ⋮ |
| $T_i+230$ | 1.00 | LEFTWARD |

FIG.24

| TIMING | PROGRESS RATE | FEED ACTION CANDIDATE | FEED ACTION FINALIZATION |
|---|---|---|---|
| $T_i$ | 0 | LEFTWARD | - |
| $T_i+10$ | 0.15 | LEFTWARD | - |
| $T_i+20$ | 0.30 | LEFTWARD | - |
| $T_i+30$ | 0.45 | UPWARD | - |
| ⋮ | ⋮ | ⋮ | ⋮ |
| $T_i+60$ | 0.90 | UPWARD | - |
| $T_i+70$ | 1.00 | - | UPWARD |

RECOGNITION APPARATUS, METHOD, AND COMPUTER PROGRAM PRODUCT

CROSS-REFERENCE TO RELATED APPLICATIONS

This application is based upon and claims the benefit of priority from Japanese Patent Application No. 2011-167608, filed on Jul. 29, 2011; the entire contents of which are incorporated herein by reference.

FIELD

Embodiments described herein relate generally to a recognition apparatus, a recognition method, and a computer program product.

BACKGROUND

Regarding recognition apparatuses configured to recognize gestures, a technology is known in which, depending on the angle of a velocity vector calculated in a section in which the velocity of a specific part, or a specific bodily part, of a photographic subject is equal to or greater than a threshold value, it is determined whether the specific part performs a gesture (movement) in the vertical direction or in the horizontal direction.

BRIEF DESCRIPTION OF THE DRAWINGS

FIG. 7 is a diagram illustrating an example of presentation according to the first embodiment;

FIG. 13 is a diagram for illustrating an example of axes each being advantageous at a particular progress according to the second embodiment;

FIG. 14 is a diagram for illustrating another example of axes each being advantageous at a particular progress according to the second embodiment;

FIG. 23 is a diagram illustrating exemplary advantageous directions each corresponding to a progress rate according to the third embodiment;

FIG. 24 is a diagram of feed action candidates each selected corresponding to a progress rate according to the third embodiment;

DETAILED DESCRIPTION

According to an embodiment, a recognition apparatus includes: an obtaining unit; a calculating unit; a principal axis selecting unit; a turning point setting unit; a section setting unit; a determining unit; and a presenting unit. The obtaining unit is configured to obtain, in chronological order, positions of a specific part of a photographic subject that are represented in a coordinate system having a first axis to an n-th axis (n≥2). The calculating unit is configured to calculate a movement vector of the specific part at each of the positions obtained in chronological order. The principal axis selecting unit is configured to calculate, for each of the movement vectors that has been calculated, a first inner product that is an inner product of the movement vector and the first axis to an n-th inner product that is an inner product of the movement vector and the n-th axis, and select, as a principal axis, an axis that is used in calculating the inner product, from among the first inner product to the n-th inner product, having the greatest modulus. The turning point setting unit is configured to set a position at which there is a change in the principal axis as a principal axis turning point and a direction turning point, and set a position at which there is a change in the direction of any of the movement vectors in the principal axis component as the direction turning point. The section setting unit is configured to set a determination target section, in which a start point is either set to the latest principal axis turning point when the principal axis turning points are present or set to an initial point indicating the initially-obtained position when the principal axis turning points are absent, and in which an end point is set to a latest point that indicates the most-recently obtained position, set a previous section, in which an end point is set to the start point of the determination target section and in which a start point is either set to a direction turning point present immediately before the end point when the direction turning points are present before the end point or set to the initial point when the direction turning points are not present immediately before the end point. The determining unit is configured to calculate an evaluation value of the determination target section and an evaluation value of the immediately previous section and, based on the evaluation value of the determination target section and the evaluation value of the previous section, determine which of the first axis to the n-th axis is advantageous for movement of the specific part in the determination target section. The presenting unit is configured to perform presentation according to a determination result obtained by the determining unit.

First Embodiment

Figure 1:
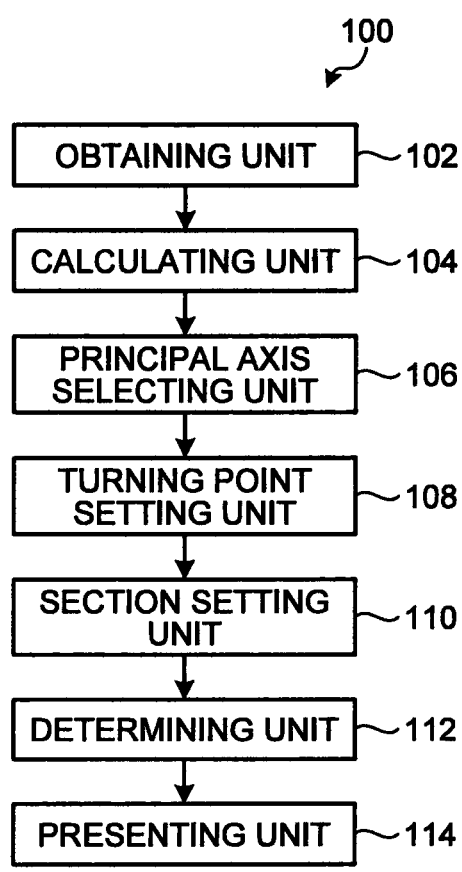
FIG. 1 is a configuration diagram illustrating an example of a recognition apparatus according to a first embodiment.

FIG. 1 is a configuration diagram illustrating an example of a recognition apparatus 100 according to a first embodiment. As illustrated in FIG. 1, the recognition apparatus 100 includes an obtaining unit 102, a calculating unit 104, a principal axis selecting unit 106, a turning point setting unit 108, a section setting unit 110, a determining unit 112, and a presenting unit 114.

The obtaining unit 102 obtains, in chronological order, the positions of a specific part, or a specific bodily part of a photographic subject that are represented in a coordinate system having a first axis and a second axis. For example, with respect to chronological images captured using an imaging element such as an image sensor, the obtaining unit 102 detects the position of the specific part from each image using at least one of the techniques such as the pattern recognizing technique, the background differencing technique, the skin color extracting technique, and the inter-frame differencing technique; and obtains the detected positions of the specific part. Herein, as a position of the specific part, it is possible to consider the center of gravity of the detected area of the specific part.

Figure 2:
FIG. 2 is a diagram illustrating an example of a gesture of a specific part according to the first embodiment.
Figure 3:
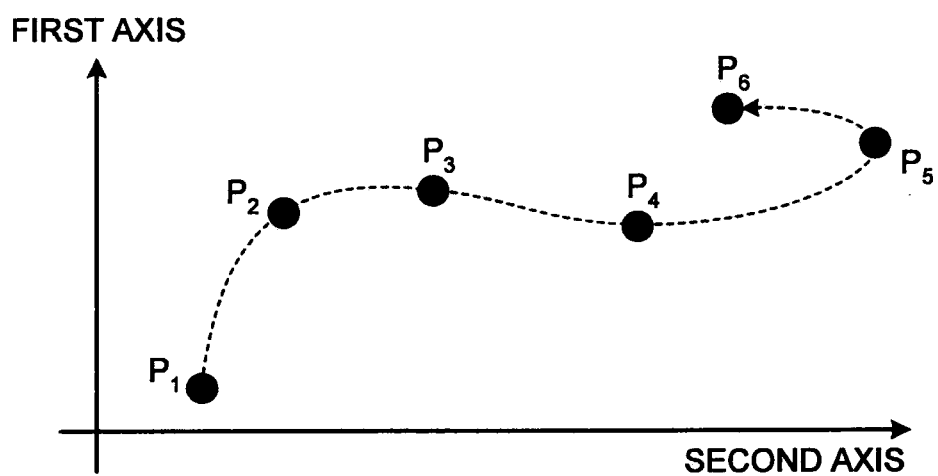
FIG. 3 is a diagram illustrating an example of positions of the specific part.

FIG. 2 is a diagram illustrating an example of a gesture of a specific part according to the first embodiment. FIG. 3 is a diagram illustrating an example of positions of the specific part that are obtained in chronological order by the obtaining unit 102. For example, when the specific part follows a movement trajectory as illustrated in FIG. 2; the obtaining unit 102 obtains discreet positions $P_1$ to $P_6$, which are sampled from time-series images, as the positions in chronological order of the specific part as illustrated in FIG. 3.

In the first embodiment, the explanation is confined to an example in which the specific part points to a hand of the photographic subject (user). However, alternatively, the specific part can also be the fingers of the photographic subject, the head of the photographic subject, or a light emitting unit of a laser point.

Herein, the positions of the specific part are represented in the coordinate system having the first axis and the second axis. Thus, as long as the first axis and the second axis are discrimination targets for the gestures (movement) of the specific part, they serve the purpose. In the first embodiment, it is an object to discriminate the gestures in the vertical (up-down) direction from the gestures in the horizontal (left-right) direction. With that in mind, the first axis is treated as the axis in the vertical direction and the second axis is treated as the axis in the horizontal direction, and it is assumed that the first axis and the second axis intersect with each other. However, that is not the only possible case. For example, if the object is to discriminate the gestures in the northwest-southeast direction from the gestures in the northeast-southwest direction, then the first axis can be treated as the axis in the northwest-southeast direction and the second axis can be treated as the axis in the northeast-southwest direction. Still alternatively, depth information that is estimated from an imaging element or from a distance sensor also can be considered as either one of the first axis and the second axis.

Moreover, the positions of the specific part that are expressed in the coordinate system having the first axis and the second axis can either be expressed by the coordinates having those axes as the components or be expressed by the coordinates defined on images captured by the imaging element (expressed by pixel positions). Furthermore, the coordinates expressing the positions of the specific part can either be absolute coordinates or be relative coordinates from the position of the face of the user. Moreover, the positions of the specific part can be coordinate values normalized from the face of the user or from the initially-detected size of the specific part.

Meanwhile, the obtaining unit 102 can be configured not only to obtain the positions of the specific part but also to obtain the timings of obtaining the positions. For example, when the positions of the specific part are expressed in x and y coordinates on images; then, in an i-th frame, the obtaining unit 102 obtains a position $(x_i, y_i)$ as well as a timing $T_i$. The timing can be expressed as, for example, the elapsed time, the elapsed clock count, or the elapsed frame count based on the activation time of the recognition apparatus 100 or based on the start time of obtaining positions of the obtaining unit 102. Herein, although the explanation is given for a case of obtaining the position for each obtained frame, it is not the only possible case.

The calculating unit 104 calculates a movement vector of the specific part at each position obtained in chronological order. In the first embodiment, the explanation is given for a case when each movement vector is a relative vector with respect to the previously-obtained position obtained by the obtaining unit 102. However, that is not the only possible case.

Figure 4:
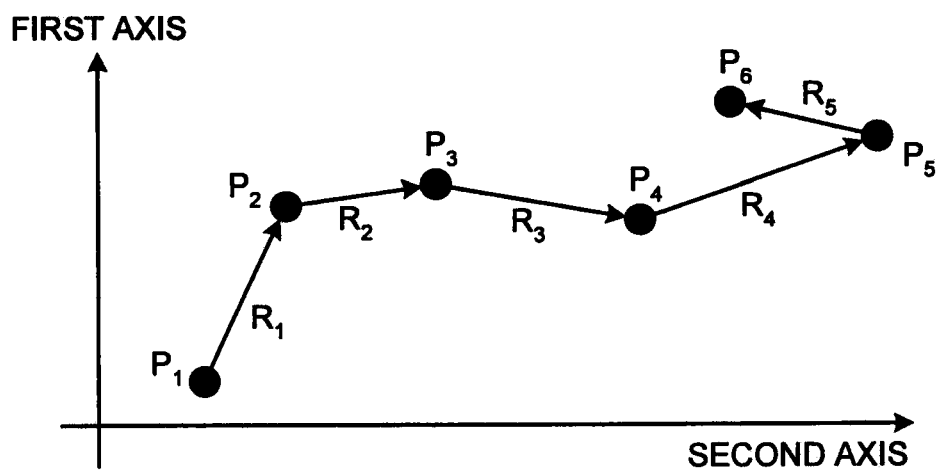
FIG. 4 is a diagram illustrating an example of movement vectors according to the first embodiment.

FIG. 4 is a diagram illustrating an example of movement vectors calculated by the calculating unit 104 according to the first embodiment. For example, when the obtaining unit 102 obtains the position $P_2$, the calculating unit 104 calculates a movement vector $R_1$ that is the relative vector obtained with respect to the previously-obtained position $P_1$ (i.e. the position $P_1$ obtained in the previous frame). More particularly, if the position $P_1$ has coordinates $(x_1, y_1)$ and the position $P_2$ has coordinates $(x_2, y_2)$ (herein, the second axis is assumed to be the x axis and the first axis is assumed to be the y axis); then the calculating unit 104 calculates a movement vector $R_1 = (x_2-x_1, y_2-y_1)^T$, where T represents a transposed matrix.

Meanwhile, a movement vector need not be a relative vector with respect to the previously-obtained position. Alternatively, a movement vector can be a relative vector with respect to a position obtained at some number of times earlier (obtained at some number of frames earlier) or can be a relative vector with respect to a direction turning point (described later in detail) present at the previous position. Moreover, a movement vector can be vector that has a slope calculated from the previously-obtained position (i.e., the position obtained in the previous frame), the currently-obtained position (i.e., the position obtained in the current position), and the subsequently-obtained position (i.e., the position obtained in the subsequent frame); and that passes through the currently-obtained position. If the previously-obtained position $P_1$ has coordinates $(x_1, y_1)$, the currently-obtained position $P_2$ has coordinates $(x_2, y_2)$, and the subsequently-obtained position $P_3$ has coordinates $(x_3, y_3)$; then, for example, the abovementioned slope can be considered to be the average of a slope $(y_2-y_1/x_2-x_1)$ of the vector between the positions $P_1$ and $P_2$ and a slope $(y_3-y_2/x_3-x_2)$ of the vector between the positions $P_2$ and $P_3$. Alternatively, a movement vector can be a vector that has a slope calculated by estimating the movement direction of the specific part from the direction of the blur of the specific part on images captured by an imaging element; and that passes through the currently-obtained position.

For each movement vector that is calculated, the principal axis selecting unit 106 calculates a first inner product that is the inner product of the movement vector and the first axis and calculates a second inner product that is the inner product of the movement vector and the second axis. Then, of the first axis and the second axis, the principal axis selecting unit 106 selects the axis that is used in calculating the inner product, from among the first inner product and the second inner product, having the greater modulus as the principal axis. That is, of the first axis and the second axis, the principal axis selecting unit 106 selects the axis closer to the direction of gestures of the specific part.

For example, as illustrated in the example in FIG. 4, the first axis and the second axis intersect at a right angle. Thus, if the slope of a movement vector with respect to the first axis is within the range of ±45°, that is, if the acute angle between the first axis and a movement vector is within the range of ±45°; then the principal axis selecting unit 106 selects the first axis as the principal axis. On the other hand, if the slope of a movement vector with respect to the second axis is within the range of ±45°, that is, if the acute angle between the second axis and a movement vector is within the range of ±45°; then the principal axis selecting unit 106 selects the second axis as the principal axis. As a result, the principal axis selecting unit 106 selects the first axis as the principal axis of the movement vector $R_1$ and selects the second axis as the principal axis of each of movement vectors $R_2$ to $R_5$. Hence, between the positions $P_1$ and $P_2$, the first axis serves as the principal axis; and between the positions $P_2$ to $P_6$, the second axis serves as the principal axis.

Meanwhile, the principal axis selecting unit 106 can also be configured to perform correction in the form of increasing the inner product, from among the first inner product and the second inner product, which was calculated using the principal axis of the previously-calculated movement vector. That is, the principal axis selecting unit 106 can be configured to set hysteresis for selecting the principal axis and to perform correction in such a way that, for example, if the first axis was selected as the principal axis on the previous occasion, the same first axis is selected as the current principal axis without difficulty.

For example, the principal axis selecting unit 106 calculates a principal axis inner product, which points to the inner product of the movement vector and the axis selected as the principal axis on the previous occasion, and calculates a non-principal axis inner product, which points to the inner product of the movement vector and the axis not selected as the principal axis on the previous occasion. Then, the principal axis selecting unit 106 applies a correction function to increment the principal axis inner product and compares the post-correction principal axis inner product with the pre-correction principal axis inner product. Accordingly, the principal axis selecting unit 106 selects the axis that is used in calculating the inner product having the greater modulus, from among the post-correction principal axis inner product and the principal axis inner product, as the principal axis. Herein, for example, the correction function can be set to $\gamma(\gamma>1.0)$. Moreover, consider the case when the first axis and the second axis intersect at a right angle. In that case, for example, if the slope of a movement vector with respect to the axis selected as the principal axis on the previous occasion is within the range of ±50°, then the principal axis selecting unit 106 can select that axis as the principal axis. On the other hand, if the slope of a movement vector with respect to the axis not selected as the principal axis on the previous occasion is within the range of ±40°, then the principal axis selecting unit 106 can select that axis as the principal axis.

The turning point setting unit 108 sets positions at which there is a change in the principal axis as principal axis turning points and direction turning points, and sets positions at which there is a change in the direction of the movement vectors in the principal axis component as the direction turning points. For example, as illustrated in FIG. 4, since the principal axis changes from the first axis to the second axis at the position $P_2$, the turning point setting unit 108 sets the position $P_2$ as a principal axis turning point and a direction turning point. Moreover, at the position $P_5$, in the component of the second axis serving as the principal axis, the direction of the movement vector changes from the right-hand direction to the left-hand direction. Thus, the turning point setting unit 108 sets the position $P_5$ as a direction turning point.

Meanwhile, as far as a change in the direction of any of the movement vectors in the principal axis component is concerned, the turning point setting unit 108 can determine that change with a change in the sign of the inner product of the movement vector and the principal axis. Moreover, at the positions $P_3$ and $P_4$, the direction of the movement vector changes in the component of the first axis that is not the principal axis, but not in the component of the second axis that is the principal axis. Hence, the turning point setting unit 108 does not set the positions $P_3$ and $P_4$ as direction turning points.

The section setting unit 110 sets a determination target section, in which a start point is either set to the latest principal axis turning point when principal axis turning points are present or set to the initial point indicating the initially-obtained position when principal axis turning points are absent, and in which an end point is set to the latest point that indicates the most-recently obtained position. Moreover, the section setting unit 110 sets a previous section, in which an end point is set to the start point of the corresponding determination target section and in which a start point is either set to the direction turning point that is present immediately before the end point when the direction turning points are present before the end point or set to the initial point when no direction turning point is present before the end point. Herein, the gesture portion set in the determination target section becomes the determination target for determining whether that gesture is in the direction along the first axis or in the direction along the second axis. Moreover, the gesture portion set in the previous section is used in determining whether or not the gesture portion set in the determination target section is noise, which points to unnecessary information that has no relation to the gesture (such as waving a hand) intended by the photographic subject (user).

In the first embodiment, it is assumed that determination target sections and the respective previous sections are set online, that is, in real time by the section setting unit 110. However, alternatively, it is also possible to set those sections by performing batch processing, that is, after the gesture is performed. Herein, for the sake of convenience, firstly, the explanation is given for the case when the determination target sections and the respective previous sections are set by performing batch processing. After that, the explanation is given for the case when those sections are set in real time.

Figure 5:
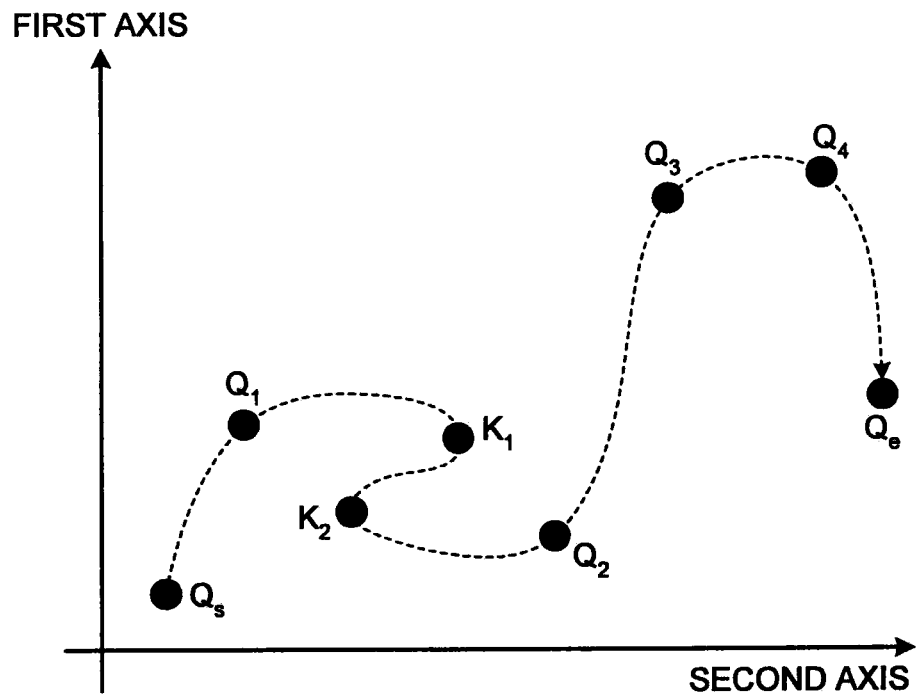
FIG. 5 is an explanatory diagram for explaining an example of setting determination target sections and respective previous sections according to the first embodiment.

FIG. 5 is an explanatory diagram for explaining an example of a method of setting determination target sections and the respective previous sections by performing batch processing. In the example illustrated in FIG. 5, $Q_s$ represents the initial position that is obtained by the obtaining unit 102 and that serves as the start point; $Q_1$ to $Q_4$ represent principal axis turning points and direction turning points; $K_1$ and $K_2$ represent direction turning points; and $Q_e$ represents the last position that is obtained by the obtaining unit 102 and that serves as the end point.

In the case of setting the determination target sections and the respective previous sections by performing batch processing; once the points $Q_s$ to $Q_e$ are obtained, the section setting unit 110 sets determination target sections and the respective previous sections in order and sequentially outputs the information about those sections to the determining unit 112. The information about a determination target section and the corresponding previous section can contain the positions at both ends separating that determination target section from the corresponding previous section, or can contain the timings of obtaining those positions, or can contain IDs of those positions.

More particularly, firstly, the section setting unit 110 sets a section $Q_s$ to $Q_1$ as the determination target section in which $Q_s$ serves as the start point and $Q_1$ serves as the end point; and sends the information about that determination target section to the determining unit 112. In this case, the section setting unit 110 does not set any previous section. Subsequently, the section setting unit 110 sets a section $Q_1$ to $Q_2$ as the determination target section in which $Q_1$ serves as the start point and $Q_2$ serves as the end point. Besides, the section setting unit 110 sets the section $Q_s$ to $Q_1$ as the corresponding previous section in which $Q_s$ serves as the start point and $Q_1$ serves as the end point. Then, the section setting unit 110 sends the information about that determination target section and the corresponding previous section to the determining unit 112. In an identical manner, the section setting unit 110 sets a section $Q_2$ to $Q_3$ as the determination target section and sets a section $K_2$ to $Q_2$ as the corresponding previous section, and outputs that information to the determining unit 112. Similarly, the section setting unit 110 sets a section $Q_3$ to $Q_4$ as the determination target section and sets a section $Q_2$ to $Q_3$ as the corresponding previous section, and outputs that information to the determining unit 112. Moreover, the section setting unit 110 sets a section $Q_4$ to $Q_e$ as the determination target section and sets a section $Q_3$ to $Q_4$ as the corresponding previous section, and outputs that information to the determining unit 112.

Thus, while setting the determination target sections and the respective previous sections by batch processing; the section setting unit 110 sets determination target sections in each of which the start point is either set to the initial point or set to a principal axis turning point in a sequential manner, and in each of which the end point is either set to a principal axis turning point present immediately after the corresponding start point, when the principal axis turning points are present subsequent to the corresponding start point, or set to the last point when no principal axis turning point is present subsequent to the corresponding start point. Moreover, the section setting unit 110 sets previous sections in each of which the end point is set to the start point of the subsequent determination target section, and in each of which the start point is either set to the direction turning point present immediately before that end point when the direction turning points are present before the end point or set to the initial point when no direction turning point is present before the end point.

Explained below is the case in which the determination target sections and the respective previous sections are set in real time. While setting the determination target sections and the respective previous sections in real time, every time the obtaining unit 102 obtains a position, the section setting unit 110 sets a determination target section and the corresponding previous section, and outputs the information about those sections to the determining unit 112.

The specific explanation is given with reference to FIG. 4. Firstly, even when the obtaining unit 102 obtains the latest point (the initial point) $P_1$ that indicates the most-recently obtained position, the section setting unit 110 neither sets a determination target section nor sets a previous section.

Then, once the obtaining unit 102 obtains the latest point $P_2$, the section setting unit 110 sets the section $P_1$ to $P_2$ as the determination target section in which the start point is set to the initial point $P_1$ and the end point is set to the latest point $P_2$, and outputs the information of that determination target section to the determining unit 112. In this case, the section setting unit 110 does not set any previous section.

Subsequently, when the obtaining unit 102 obtains the latest point $P_3$, the position $P_2$ becomes the principal axis turning point. Hence, the section setting unit 110 sets the section $P_2$ to $P_3$ as the determination target section in which the start point is set to the latest principal axis turning point $P_2$ and the end point is set to the latest point $P_3$. Besides, the section setting unit 110 sets the section $P_1$ to $P_2$ as the corresponding previous section in which the start point is set to the initial point $P_1$ and the end point is set to the principal axis turning point $P_2$. Then, the section setting unit 110 sends the information about those two sections to the determining unit 112.

Subsequently, when the obtaining unit 102 obtains the latest point $P_4$, the section setting unit 110 sets the section $P_2$ to $P_4$ as the determination target section in which the start point is set to the latest principal axis turning point $P_2$ and the end point is set to the latest point $P_4$. Besides, the section setting unit 110 sets the section $P_1$ to $P_2$ as the corresponding previous section in which the start point is set to the initial point $P_1$ and the end point is set to the principal axis turning point $P_2$. Then, the section setting unit 110 sends the information about those two sections to the determining unit 112.

Subsequently, when the obtaining unit 102 obtains the latest point $P_5$, the section setting unit 110 sets the section $P_2$ to $P_5$ as the determination target section in which the start point is set to the latest principal axis turning point $P_2$ and the end point is set to the latest point $P_5$. Besides, the section setting unit 110 sets the section $P_1$ to $P_2$ as the corresponding previous section in which the start point is set to the initial point $P_1$ and the end point is set to the principal axis turning point $P_2$. Then, the section setting unit 110 sends the information about those two sections to the determining unit 112.

Subsequently, when the obtaining unit 102 obtains the latest point $P_6$, the section setting unit 110 sets the section $P_2$ to $P_6$ as the determination target section in which the start point is set to the latest principal axis turning point $P_2$ and the end point is set to the latest point $P_6$. Besides, the section setting unit 110 sets the section $P_1$ to $P_2$ as the corresponding previous section in which the start point is set to the initial point $P_1$ and the end point is set to the principal axis turning point $P_2$. Then, the section setting unit 110 sends the information about those two sections to the determining unit 112.

Then, the determining unit 112 calculates an evaluation value of the determination target section and an evaluation value of the corresponding previous section and, based on those evaluation values, determines which of the first axis and the second axis is advantageous for the movement of the specific part in the determination target section. More particularly, when the evaluation value of the determination target section exceeds the evaluation value of the previous section, the determining unit 112 determines that the principal axis in the determination target section is advantageous for the movement of the specific part in the determination target section. On the other hand, when the evaluation value of the determination target section is equal to or smaller than the evaluation value of the previous section, the determining unit 112 determines that the principal axis in the previous section is advantageous for the movement of the specific part in the determination target section.

Herein, an evaluation value points to at least one of the following: the amount of change in the position or in the size of the specific part (i.e., the movement distance); the rate of change in the position or in the size of the specific part (i.e., the movement velocity); and the rate of acceleration in the position or in the size of the specific part (i.e., the movement acceleration). For example, an evaluation value can be expressed as a function having the movement distance and the movement velocity of the specific part as illustrated in Equation (1) given below or can be expressed as a function having the movement distance, the movement velocity, and the movement acceleration of the specific part as illustrated in Equation (2) given below. Still alternatively, an evaluation value can be expressed as the movement distance of the specific part, or the movement velocity of the specific part, or the movement acceleration of the specific part.

$$E = V \times \sqrt{L} \quad (1)$$

$$E = V \times L \times \alpha \quad (2)$$

where, E represents the evaluation value, V represents the movement velocity, L represents the movement distance, and $\alpha$ represents the movement acceleration.

The movement distance can be considered to be the sum of Euclidean distances of the movement vectors in the determination target section or can be considered to be the sum of the principal axis components (sum of the modulus of the inner product of each movement vector and the principal axis) of the movement vectors. For example, in the example illustrated in FIG. 4, in the section $P_2$ to $P_5$ that serves as the determination target section at the point of time of obtaining the latest point $P_5$, the movement distance can be considered to be the total distance calculated by adding the Euclidean distances of the movement vectors $R_2$ to $R_4$.

The movement velocity can be considered to be the maximum velocity among the velocities of the movement vectors in the determination target section or can be considered to be the average velocity of the velocities of the movement vectors that are equal to or greater than a predetermined threshold value. Herein, if end points $P_b$ and $P_c$ at both ends of a movement vector are obtained at timings $T_b$ and $T_c$, respectively; then the velocity of that movement vector can be calculated as |(distance between $P_b$ and $P_c$)/($T_b - T_c$)|. For example, in the example illustrated in FIG. 4, the movement velocity in the section $P_2$ to $P_5$ can be considered to be the maximum velocity among the velocities of the movement vectors $R_2$ to $R_4$. If the end points $P_2$ and $P_3$ at both ends of the movement vector $R_2$ are obtained at timings $T_2$ and $T_3$, respectively; then the velocity of the movement vector $R_2$ can be calculated as |(Euclidean distance of the movement vector $R_2$)/($T_3 - T_2$)|.

Meanwhile, the method of calculating the movement velocity of the specific part is not limited to the description given above. For example, the determining unit 112 can be configured to calculate the velocities of pixels surrounding the positions of the specific part that are obtained by the obtaining unit 102 (i.e., to calculate the optical flow), and to set the average or the mode of the velocities of pixels as the movement velocity of the specific part.

Alternatively, for example, by considering the position of the specific part inside an image as an observation value and by considering the position and the velocity of the specific part as state variables, the determining unit 112 can calculate the movement velocity of the specific part with the use of a filter such as the Kalman filter that estimates the optimum state using a movement model of state variables such as an observation value and a uniform motion. At that time, as the observation value, the determining unit 112 can further make use of the average of the velocities of pixels surrounding the positions of the specific part (i.e., the average of the optical flow).

The movement acceleration can be considered to be the maximum rate of acceleration from among the rates of acceleration of the movement vectors in the determination target section or can be considered to be the average of the rates of acceleration of the movement vectors that are equal to or greater than a predetermined threshold value. Herein, if the end points $P_b$ and $P_c$ at both ends of a movement vector are obtained at the timings $T_b$ and $T_c$, respectively, and if the points $P_a$ and $P_b$ at both ends of the previous movement vector are obtained at timings $T_a$ and $T_b$, respectively; then the movement acceleration of that movement vector can be calculated as |(velocity from $P_b$ to $P_c$)−(velocity from $P_a$ to $P_c$)/($T_b - T_c$)|.

Explained below in detail with reference to FIG. 4 is the method of determining the advantageous axis for the movement of the specific part in a determination target section. Firstly, when the section setting unit 110 sets the section $P_1$ to $P_2$ as the determination target section, no previous section exists. Hence, the determining unit 112 determines that the first axis serving as the principal axis in the section $P_1$ to $P_2$ is advantageous for the movement of the specific part.

Subsequently, the section setting unit 110 sets the section $P_2$ to $P_3$ as the determination target section and sets the section $P_1$ to $P_2$ as the corresponding previous section. In that case, the determining unit 112 calculates the evaluation values of the section $P_2$ to $P_3$ and the section $P_1$ to $P_2$. Herein, it is assumed that the evaluation value of the section $P_2$ to $P_3$ (the determination target section) is equal to or smaller than the evaluation value of the section $P_1$ to $P_2$ (the corresponding previous section). Thus, although the section $P_2$ to $P_3$ has the second axis as the principal axis, the determining unit 112 determines that the first axis, which is the principal axis in the section $P_1$ to $P_2$, is advantageous for the movement of the specific part. That is, at that particular point of time, the determining unit 112 considers the movement trajectory of the section $P_2$ to $P_3$ as noise.

Subsequently, the section setting unit 110 sets the section $P_2$ to $P_4$ as the determination target section and sets the section $P_1$ to $P_2$ as the corresponding previous section. In that case, the determining unit 112 calculates the evaluation values of the section $P_2$ to $P_4$ and the section $P_1$ to $P_2$. However, regarding the section $P_1$ to $P_2$, it is also possible to use the evaluation value calculated on the previous occasion. Herein, it is assumed that the evaluation value of the section $P_2$ to $P_4$ (the determination target section) exceeds the evaluation value of the section $P_1$ to $P_2$ (the corresponding previous section). Thus, the determining unit 112 determines that the second axis, which is the principal axis in the section $P_2$ to $P_4$, is advantageous for the movement of the specific part. That is, at that particular point of time, the determining unit 112 considers the movement trajectory of the section $P_2$ to $P_4$ as a gesture.

In an identical manner, when each of the section $P_2$ to $P_5$ and the section $P_2$ to $P_6$ is set as the determination target section, the evaluation value of the determination target section is assumed to exceed the evaluation value of the corresponding previous section. Hence, regarding each of those two determination target sections, the determining unit 112 determines that the second axis serving as the principal axis is advantageous for the movement of the specific part.

Figure 6:
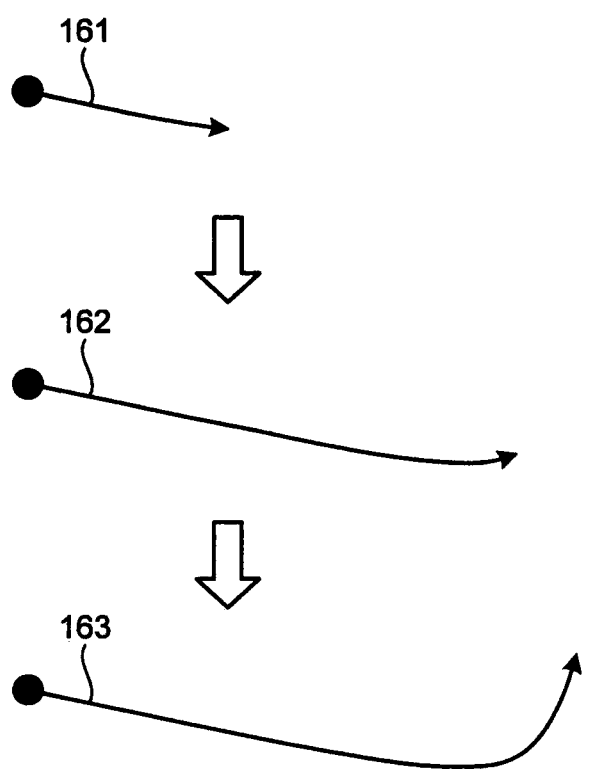
FIG. 6 is a diagram illustrating another example of a gesture performed by the specific part according to the first embodiment.

FIG. 6 is a diagram illustrating another example of a gesture performed by the specific part according to the first embodiment. In the example illustrated in FIG. 6, the specific part follows a trajectory in the right-hand direction (trajectories 261 and 262) and then follows a trajectory in the upward direction (trajectory 263). Meanwhile, in the example illustrated in FIG. 6, the movement distance is used as the evaluation value.

During the trajectories 261 and 262, the trajectory in the right-hand direction serves as the determination target section, and there is no previous section. Consequently, the determining unit 112 determines that the axis in the horizontal direction, which is the principal axis in the determination target section, is advantageous for the movement of the specific part.

During the trajectory 263, the trajectory in the upward direction serves as the determination target section, and the trajectory in the right-hand direction serves as the corresponding previous section. Since the trajectory in the upward direction has a shorter movement distance than the movement distance of the trajectory in the right-hand direction, the determining unit 112 determines that the evaluation value of the trajectory in the right-hand direction exceeds the evaluation value of the trajectory in the upward direction. Accordingly, in that determination target section too, the determining unit 112 determines that the axis in the horizontal direction, which is the principal axis in the corresponding previous section, is advantageous for the movement of the specific part.

As a result, any gesture in the vertical direction is considered as noise, and the horizontal direction is determined to be advantageous as far as the entire gesture is concerned.

The presenting unit 114 performs presentation according to the determination result of the presenting unit 114. For example, the presenting unit 114 performs transition of the screen, which is displayed on a display, in the direction of the axis, from among the first axis and the second axis, which is determined by the determining unit 112 to be advantageous for the movement of the specific part.

FIG. 7 is a diagram illustrating an example of presentation performed by the presenting unit 114 according to the first embodiment. In the example illustrated in FIG. 7, the presenting unit 114 displays an object 181 on the left side of a screen 180, displays an object 182 in the center of the screen 180, and displays an object 183 on the right side of the screen 180. Herein, assume that the user performs a gesture of moving a hand 186, which represents the specific part, in a direction 187, that is, in the left-hand direction. Regarding that gesture, since the determining unit 112 determines that the axis in the horizontal direction is advantageous for the movement of the hand 186; the presenting unit 114 performs transition of the objects in the horizontal direction (to the left side) on the screen 180. As a result, on the screen 180, the presenting unit 114 displays the object 182 on the left side, the object 183 in the center, and an object 184 on the right side.

Meanwhile, if the recognition apparatus 100 includes a command issuing unit for issuing a command according to the determination result obtained by the determining unit 112, then the presenting unit 114 performs presentation according to the issued command.

For example, to the command issuing unit, the determining unit 112 outputs the ID of the axis that is determined to be advantageous for the movement of the specific part. Herein, to the command issuing unit, the determining unit 112 can be configured to output the ID of the axis that is determined to be advantageous for the movement of the specific part as well as output the information about the determination target section such as the IDs of both end points of the determination target section. Alternatively, only when there is a change in the axis that is determined to be advantageous for the movement of the specific part, the determining unit 112 can be configured to output the ID of the new axis to the command issuing unit.

Then, if the movement velocity of the specific part in that axis component is equal to or greater than a threshold value, the command issuing unit issues a command for the direction of that axis. For example, in the example illustrated in FIG. 4, when the section $P_2$ to $P_3$ is the determination target section, the first axis becomes the advantageous axis for the movement of the specific part in the determination target section. Therefore, if the velocity of the movement vector $R_2$ in the first axis component (i.e., the modulus of the inner product of the movement vector $R_2$ and the first axis) is equal to or greater than a threshold value, that is, if the velocity component of the movement vector $R_2$ in the upward direction is equal to or greater than a threshold value; then the command issuing unit issues a command for the upward direction. In contrast, when the section $P_2$ to $P_4$ is the determination target section, the second axis becomes the advantageous axis for the movement of the specific part in the determination target section. Therefore, if the velocity component in the right-hand direction of the greater velocity, of the velocities in the first axis components of the movement vectors $R_2$ and $R_3$, is equal to or greater than a threshold value; then the command issuing unit issues a command for the right-hand direction.

According to the command that has been issued, the presenting unit performs transition of the screen being displayed on the display.

Figure 8:
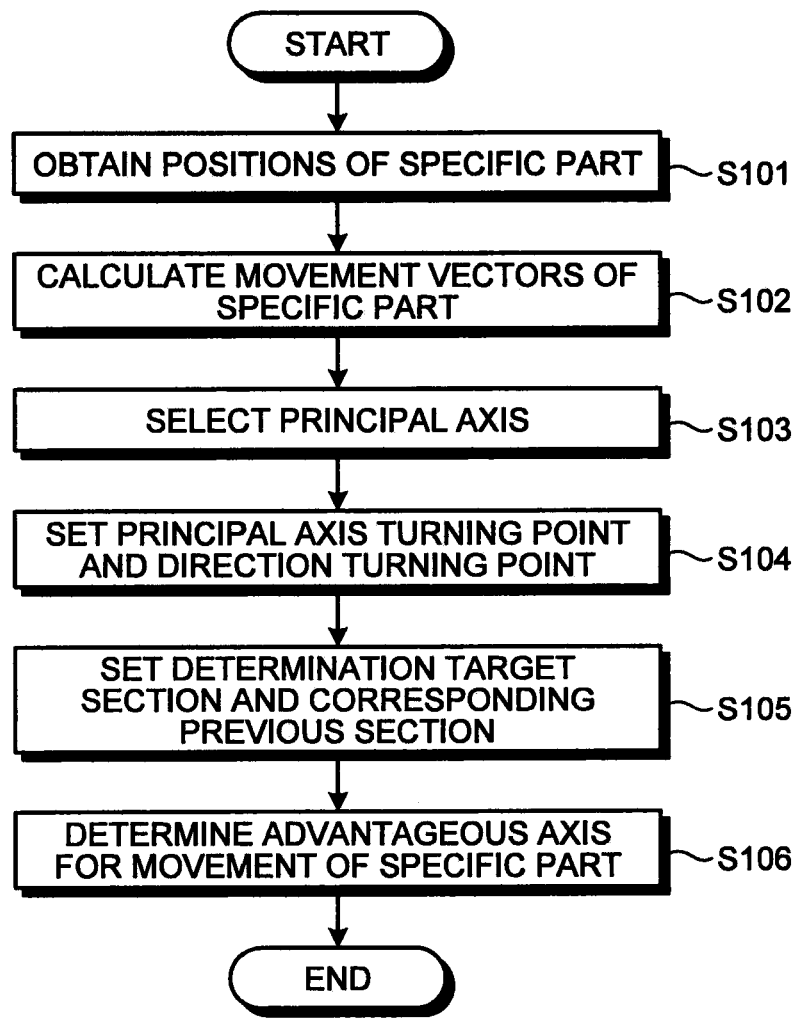
FIG. 8 is a flowchart for explaining an exemplary sequence of operations performed by the recognition apparatus according to the first embodiment.

FIG. 8 is a flowchart for explaining an exemplary sequence of operations performed by the recognition apparatus 100 according to the first embodiment.

Firstly, the obtaining unit 102 obtains positions of a specific part of a photographic subject that are represented in a coordinate system having a first axis and a second axis (Step S101).

Then, with respect to the positions obtained by the obtaining unit 102, the calculating unit 104 calculates relative vectors from the respective previously-obtained positions as movement vectors of the specific part (Step S102).

Subsequently, for each movement vector that is calculated by the calculating unit 104, the principal axis selecting unit 106 calculates a first inner product that is the inner product of the movement vector and the first axis and calculates a second inner product that is the inner product of the movement vector and the second axis. Then, of the first axis and the second axis, the principal axis selecting unit 106 selects the axis that is used in calculating the inner product, from among the first inner product and the second inner product, having the greater modulus as the principal axis (Step S103).

Subsequently, if the principal axis changes at the previously-obtained position obtained by the obtaining unit 102, the turning point setting unit 108 sets that position as a principal axis turning point and a direction turning point; and if the direction of the movement vector changes in the principal axis component at the previously-obtained position obtained by the obtaining unit 102, the turning point setting unit 108 sets that position as a direction turning point (Step S104).

Then, the section setting unit 110 sets a determination target section, in which a start point is either set to the latest principal axis turning point when principal axis turning points are present or set to the initially-obtained position when principal axis turning points are absent, and in which an end point is set to the latest point that indicates the most-recently obtained position. Moreover, the section setting unit 110 sets a previous section, in which an end point is set to the start point of the determination target section and in which a start point is either set to the direction turning point present immediately before the end point when the direction turning points are present before the end point or set to the initial point when no direction turning point is present before the end point (Step S105).

Subsequently, the determining unit 112 calculates an evaluation value of the determination target section and an evaluation value of the corresponding previous section and, based on those evaluation values, determines which of the first axis and the second axis is advantageous for the movement of the specific part in the determination target section (Step S106).

Every time the obtaining unit 102 obtains the latest position of the specific part of the photographic subject (Step S101), the operations from Step S102 to Step S106 are repeated, and the presenting unit 114 performs presentation according to the determination result obtained by the determining unit 112.

Figure 9:
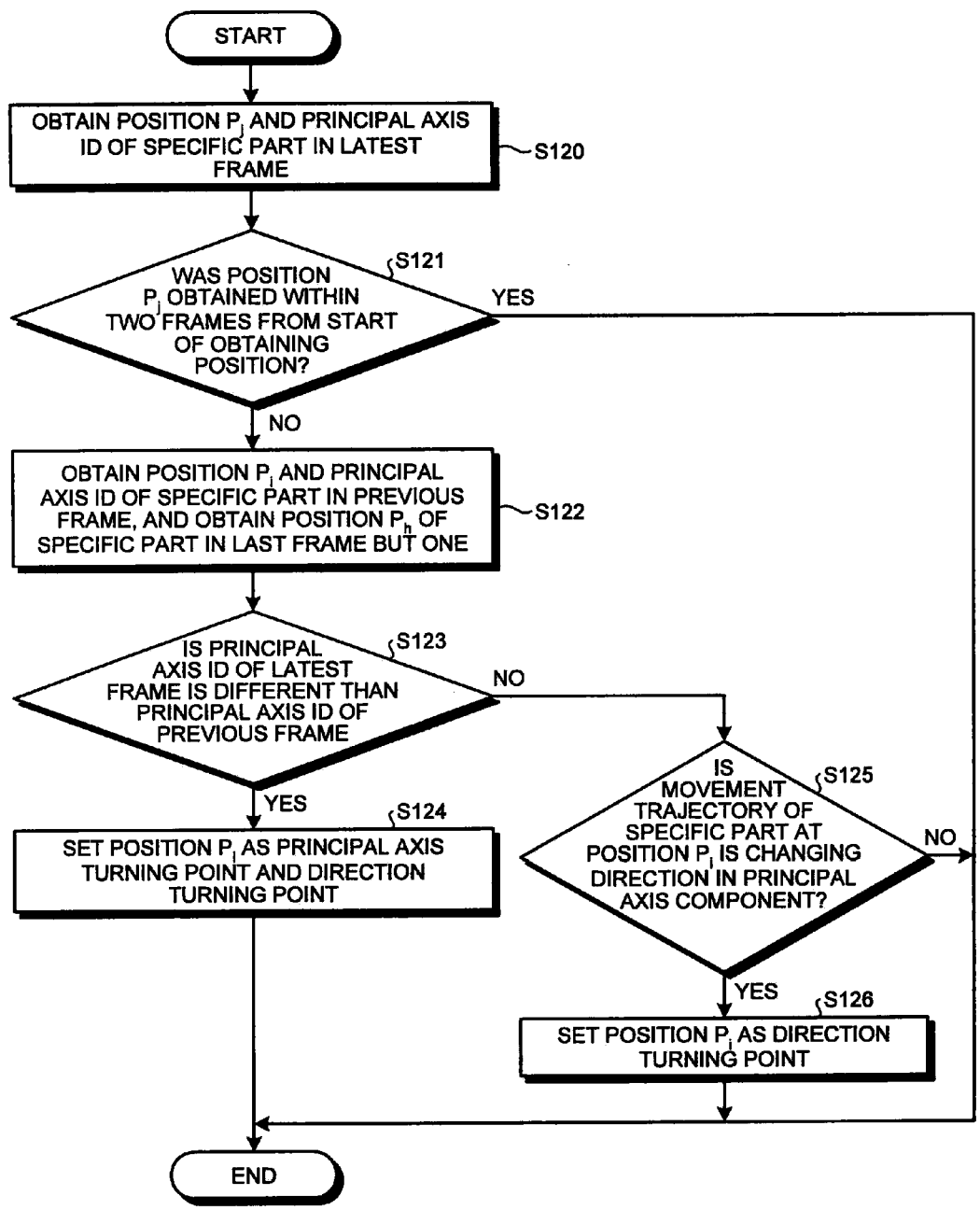
FIG. 9 is a flowchart for explaining an exemplary sequence of operations performed by a turning point setting unit in the recognition apparatus according to the first embodiment.

FIG. 9 is a flowchart for explaining an exemplary sequence of operations performed by the turning point setting unit 108 in the recognition apparatus 100 according to the first embodiment.

Firstly, the turning point setting unit 108 obtains, from the obtaining unit 102, a position $P_j$ of the specific part in the latest frame as well as obtains, from the principal axis selecting unit 106, a principal axis ID of the latest frame (Step S120). The principal axis ID of the latest frame points to the principal axis ID of the principal axis of a movement vector $R_i$, which is the relative vector with respect to the position $P_j$ from a position $P_i$ of the specific part in the previous frame.

Then, the turning point setting unit 108 determines whether the position $P_j$ was obtained within two frames from the point of time when the obtaining unit 102 started obtaining the positions of the specific part (Step S121). If it is determined that the position $P_j$ was obtained within two frames from the point of time of starting to obtain the positions of the specific part (Yes at Step S121), then the operations are ended. That is because not enough positions are obtained to enable setting of turning points.

On the other hand, if it is determined that the position $P_j$ was not obtained within two frames from the point of time of starting to obtain the positions of the specific part (No at Step S121), then the turning point setting unit 108 obtains, from the obtaining unit 102, the position $P_i$ of the specific part in the previous frame and a position $P_h$ of the specific part in the last but one frame; as well as obtains, from the principal axis selecting unit 106, the principal axis ID of the previous frame (Step S122). The principal axis ID of the previous frame points to the principal axis ID of the principal axis of a movement vector $R_h$, which is the relative vector with respect to the position $P_i$ from the position $P_h$ of the specific part in the last but one frame. Meanwhile, alternatively, the principal axis ID of the latest frame that is obtained in the previous frame can be stored and used by the turning point setting unit 108 as the principal axis ID of the previous frame.

Subsequently, the turning point setting unit 108 determines whether or not the principal axis ID of the latest frame is different than the principal axis ID of the previous frame (Step S123).

When the principal axis ID of the latest frame is different than the principal axis ID of the previous frame (Yes at Step S123), the turning point setting unit 108 sets the position $P_i$ as a principal axis turning point and a direction turning point (Step S124). That marks the end of the operations.

On the other hand, when the principal axis ID of the latest frame is same as the principal axis ID of the previous frame (No at Step S123), the turning point setting unit 108 determines whether or not the movement trajectory (movement vector) of the specific part at the position $P_i$ is changing direction in the principal axis component (Step S125). More particularly, the turning point setting unit 108 determines whether or not the inner product of the movement vector $R_i$ and the principal axis of the latest frame has a different sign than the sign of the inner product of the movement vector $R_j$ and the principal axis of the previous frame. However, if the inner product of the movement vector $R_j$ and the principal axis of the previous frame is equal to zero, it is understood that there was no change in the principal axis component at the movement vector $R_j$. In that case, the turning point setting unit 108 obtains a position $P_g$ of the specific part that is obtained three times earlier; and then makes use of the inner product between a movement vector $R_g$, which is the relative vector with respect to the position $P_h$ from the position $P_g$ of the specific part in the last frame but two, and the principal axis of the last frame but two.

When the movement trajectory (movement vector) of the specific part at the position $P_i$ is changing direction in the principal axis component (Yes at Step S125), that is, when both inner products have different signs; the turning point setting unit 108 sets the position $P_i$ as a direction turning point (Step S126). That marks the end of the operations.

On the other hand, when the movement trajectory (movement vector) of the specific part at the position $P_i$ is not changing direction in the principal axis component (No at Step S125), that is, when both inner products have the same sign; the operations are ended.

Figure 10:
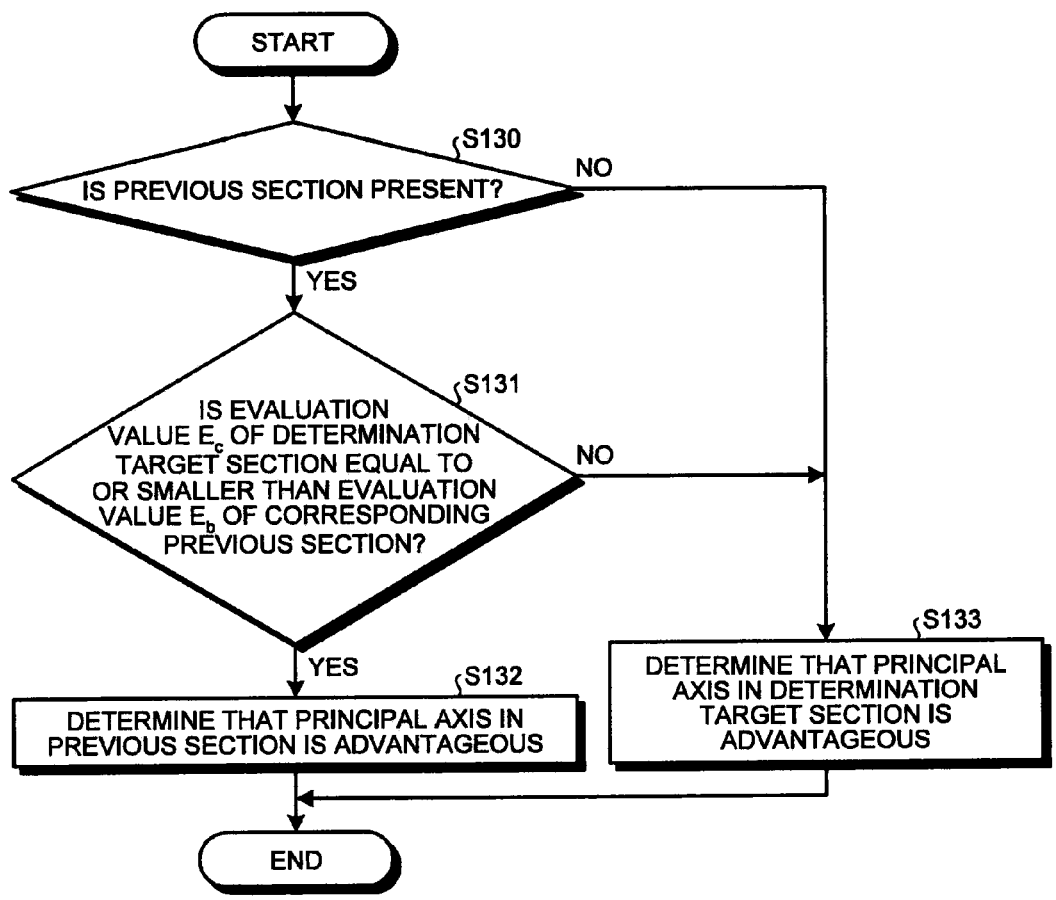
FIG. 10 is a flowchart for explaining an exemplary sequence of operations performed by a determining unit in the recognition apparatus according to the first embodiment.

FIG. 10 is a flowchart for explaining an exemplary sequence of operations performed by the determining unit 112 in the recognition apparatus 100 according to the first embodiment.

Firstly, the determining unit 112 checks whether or not a previous section is present (Step S130).

When a previous section is present (Yes at Step S130), the determining unit 112 calculates an evaluation value $E_c$ of the determination target section and an evaluation value $E_b$ of the previous section, and determines whether or not the evaluation value $E_c$ is equal to or smaller than the evaluation value $E_b$ (Step S131).

If the evaluation value $E_c$ is equal to or smaller than the evaluation value $E_b$ (Yes at Step S131), the determining unit 112 determines that the principal axis in the previous section is advantageous for the movement of the specific part in the determination target section (Step S132). That marks the end of the operations.

Meanwhile, if a previous section is absent (No at Step S130) or if the evaluation value $E_c$ is not equal to or smaller than the evaluation value $E_b$ (No at Step S131), then the determining unit 112 determines that the principal axis in the determination target section is advantageous for the movement of the specific part in the determination target section (Step S133). That marks the end of the operations.

As described above, in the first embodiment, the gesture in a determination target section is recognized using the corresponding previous section. Thus, according to the first embodiment, it becomes possible to determine whether or not the gesture in a determination target section is noise. Because of that, even if a movement representing noise is included in a gesture, such movement can be recognized correctly thereby enabling prevention of a decline in the recognition accuracy.

For example, if a movement representing noise is included at the end of a gesture, then the portion of the normal gesture represents the previous section and the noise portion represents the determination target section. There, by referring to the previous section, it becomes possible to determine that the gesture in the determination target section is noise and to make substitution with the movement direction of the normal gesture in the previous section. In this way, even when a movement representing noise is included in a gesture, the noise can be recognized in a correct manner.

Second Embodiment

In a second embodiment, the explanation is given for an example of recognizing the gesture in a determination target section by making use of the corresponding subsequent section. In the following explanation, the focus is on elaborating the differences with the first embodiment. Moreover, the constituent elements having identical functions to the functions described in the first embodiment are referred to by the same names and reference numerals, and the explanation thereof is not repeated.

Figure 11:
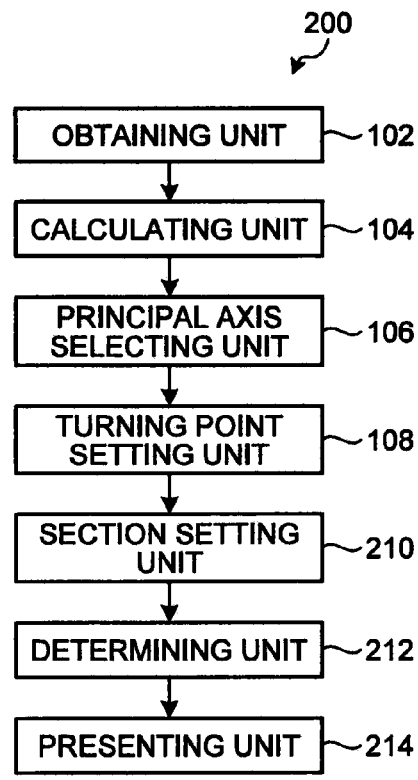
FIG. 11 is a configuration diagram illustrating an example of a recognition apparatus according to a second embodiment.

FIG. 11 is a configuration diagram illustrating an example of a recognition apparatus 200 according to the second embodiment. In the recognition apparatus 200 according to the second embodiment; a section setting unit 210, a determining unit 212, and a presenting unit 214 are different as compared to the first embodiment.

The section setting unit 210 sets a determination target section, in which a start point is either set to the latest principal axis turning point when principal axis turning points are present or set to the initially-obtained position when principal axis turning points are absent, and in which an end point is either set to the principal axis turning point present immediately after the start point, when the principal axis turning points are present subsequent to the start point but before the elapse in a predetermined time period since the setting of the start point, or set to the latest point that indicates the most-recently obtained position before the elapse in a predetermined time period, when no principal axis turning point is present subsequent to the start point but before the elapse in the predetermined time. Moreover, the section setting unit 210 sets a subsequent section, in which a start point is set to the end point of the determination target section and in which an end point is either set to the direction turning point present immediately after to the start point when the direction turning points are present subsequent to the start point or set to the latest point when the latest point is present subsequent to the start point. Moreover, the gesture portion set in the subsequent section is used in determining whether or not the gesture portion set in the determination target section is noise.

In the second embodiment too, it is assumed that determination target sections and the respective subsequent sections are set online, that is, in real time by the section setting unit 210. However, alternatively, it is also possible to set those sections by performing batch processing, that is, after the gesture is performed. Herein, for the sake of convenience, firstly, the explanation is given for the case when determination target sections and the respective subsequent sections are set by performing batch processing. Then, the explanation is given for the case when those sections are set in real time.

Explained below with reference to FIG. 5 is the setting of determination target sections and the respective subsequent sections by performing batch processing. While setting the determination target sections and the respective subsequent sections by performing batch processing, after the initial position $Q_s$ and the last position $Q_e$ are obtained, the section setting unit 210 sets the determination target sections and the respective subsequent sections in order, and sequentially outputs to the determining unit 212 the information regarding the determination target sections and the respective subsequent sections that have been set. The information regarding a determination target section and the corresponding subsequent section that have been set can contain the positions at both ends separating that determination target section from the corresponding subsequent section, or can contain the timings of obtaining those positions, or can contain IDs of those positions.

More particularly, firstly, the section setting unit 210 sets the section $Q_s$ to $Q_1$ as a determination target section in which $Q_s$ serves as the start point and $Q_1$ serves as the end point; and sets a section $Q_1$ to $K_1$ as the subsequent section in which $Q_1$ serves as the start point and $K_1$ serves as the end point. Then, the section setting unit 210 sends the information about those sections to the determining unit 212. Subsequently, the section setting unit 210 sets the section $Q_1$ to $Q_2$ as a determination target section in which $Q_1$ serves as the start point and $Q_2$ serves as the end point; and sets a section $Q_2$ to $Q_3$ as the subsequent section in which $Q_2$ serves as the start point and $Q_3$ serves as the end point. Then, the section setting unit 210 sends the information about those sections to the determining unit 212. In an identical manner, the section setting unit 210 sets the section $Q_2$ to $Q_3$ as the determination target section, sets a section $Q_3$ to $Q_4$ as the subsequent section, and sends that information to the determining unit 212. Moreover, the section setting unit 210 sets the section $Q_3$ to $Q_4$ as the determination target section, sets a section $Q_4$ to $Q_5$ as a subsequent section, and sends that information to the determining unit 212. Lastly, the section setting unit 210 sets the section $Q_4$ to $Q_5$ as the determination target section and, without setting a subsequent section, sends that information to the determining unit 212.

Thus, while setting the determination target sections and the respective subsequent sections by performing batch processing; the section setting unit 210 sets determination target sections in each of which the start point is either set to the initial point or set to a principal axis turning point in a sequential manner, and in each of which the end point is either set to a principal axis turning point present immediately after the start point, when the principal axis turning points are present subsequent to the corresponding start point, or set to the last point when no principal axis turning point is present subsequent to the corresponding start point. Moreover, the section setting unit 210 sets subsequent sections in each of which the start point is set to the end point of the corresponding determination target section, and in each of which the end point is either set to the direction turning point present immediately after the corresponding start point when the direction turning points are present subsequent to the corresponding start point or set to the last point when no direction turning point is present subsequent to the corresponding start point.

Given below is the explanation regarding setting a determination target section and the corresponding subsequent section in real time. While setting the determination target sections and the respective subsequent sections in real time, the section setting unit 210 requires a maximum predetermined time period from the start of setting a determination target section up to the finalization of that determination target section and the corresponding subsequent section. That is, since the start of setting a determination target section at the timing $T_i$, the section setting unit 210 finalizes the determination target section and the corresponding subsequent section before the elapse in a predetermined time period $T_{0a}$, that is, until the point of time of $T_i+T_{0a}$. Thus, in the second embodiment, although it is assumed that a determination target section and the corresponding subsequent section are set in real time; in a precise sense, a delay within a predetermined time period occurs before a determination target section and the corresponding subsequent section is set. With that, the determination performed by the determining unit 212 (described later) also gets delayed within a predetermined time period.

Moreover, in the second embodiment, the predetermined time period $T_{0a}$ is set to 0.4 seconds. However, that is not the only possible case. Alternatively, depending on the movement velocity of the specific part, or the specific bodily part, in a determination target section, the section setting unit 210 can change the predetermined time period $T_{0a}$. For example, the predetermined time period $T_{0a}$ can be set to decrease with an increase in the movement velocity.

The specific explanation is given with reference to FIG. 4. Firstly, even after the obtaining unit 102 obtains the latest point (the initial point) $P_1$ that indicates the latest position, the section setting unit 210 does neither sets a determination target section nor sets a subsequent section.

When the obtaining unit 102 obtains the latest point $P_2$ (assumed to be at a timing $T_2$), the section setting unit 210 sets the section $P_1$ to $P_2$, in which the initial point $P_1$ is the start point and in which the latest point $P_2$ is the end point at the timing $T_2$, as the determination target section. At that point of time, the scope of the determination target section is yet to be finalized. If another latest point is obtained after the timing $T_2$ but before the elapse in the time period $T_{0a}$, then the end point of the determination target section may be updated. However, in the example illustrated in FIG. 4, since the position $P_2$ serves as a principal axis turning point present immediately after the start point, it remains to be the end point of the determination target section.

For example, if the latest point $P_3$ is obtained after the timing $T_2$ but before the elapse in the time period $T_{0a}$, then the position $P_2$ becomes the principal axis turning point present immediately after the start point. Hence, the section setting unit 210 finalizes the section $P_1$ to $P_2$, which has the principal axis turning point $P_2$ as the end point, as the determination target section. Besides, in this case, the section setting unit 210 sets the section $P_2$ to $P_3$, which has the principal axis turning point $P_2$ as the start point and the latest point $P_3$ as the end point, as the subsequent section. Then, as the information about the determination target section when the timing $T_2$ is the setting start timing, the section setting unit 210 sends to the determining unit 212 the information about the determination target section and the corresponding subsequent section that have been set (finalized).

Besides, for example, even in the case when the latest points $P_3$ to $P_6$ are obtained after the timing $T_2$ but before the elapse in the time period $T_{0a}$, the position $P_2$ becomes the principal axis turning point present immediately after the start point. Hence, the section setting unit 210 finalizes the section $P_1$ to $P_2$, which has the principal axis turning point $P_2$ as the end point, as the determination target section. Moreover, in this case, the section setting unit 210 sets the section $P_2$ to $P_5$, which has the direction turning point $P_5$ that is the direction turning point present immediately after the start point as the end point, as the corresponding subsequent section. Then, as the information about the determination target section when the timing $T_2$ is the setting start timing, the section setting unit 210 to the determining unit 212 the information about the determination target section and the subsequent section that have been set (finalized).

Meanwhile, for example, if the latest point $P_3$ is not obtained after the timing $T_2$ and before the elapse in the time period $T_{0a}$, then the position $P_2$ becomes the latest point. Hence, the section setting unit 210 finalizes the section $P_1$ to $P_2$, which has the latest point $P_2$ as the end point, as the determination target section. In this case, the section setting unit 210 does not set a subsequent section. Then, as the information about the determination target section when the timing $T_2$ is the setting start timing, the section setting unit 210 sends to the determining unit 212 the information about the determination target section that has been finalized.

Subsequently, when the obtaining unit 102 obtains the latest point $P_2$ (assumed to be at a timing $T_3$), the section setting unit 210 sets the section $P_2$ to $P_3$, in which the latest principal axis turning point $P_2$ is the start point and in which the latest point $P_3$ is the end point at the timing $T_3$, as the determination target section. Herein, if the latest point $P_4$ is obtained after the timing $T_3$ but before the elapse in the time period $T_{0a}$, the section setting unit 210 updates the end point to the latest point $P_4$ because no principal axis turning point is present subsequent to the principal axis turning point $P_2$. Thus, the section setting unit 210 updates the determination target section to the section $P_2$ to $P_4$. In this case, the section setting unit 210 does not set a subsequent section. Then, as the information about the determination target section when the timing $T_3$ is the setting start timing, the section setting unit 210 sends to the determining unit 212 the information about the updated determination target section.

Until the obtaining unit 102 obtains the latest point $P_6$, the identical operation is performed.

Meanwhile, instead of outputting to the determining unit 212 the information about a determination target section and the corresponding subsequent section only after those sections are finalized, the section setting unit 210 can keep on outputting to the determining unit 212 the information about a determination target section and the corresponding subsequent section during the period from the start of setting the determination target section to the finalization of those sections.

Then, the determining unit 212 calculates an evaluation value of the determination target section and an evaluation value of the corresponding subsequent section and, based on those evaluation values, determines which of the first axis and the second axis is advantageous for the movement of the specific part in the determination target section. More particularly, when the evaluation value of the determination target section exceeds the evaluation value of the corresponding subsequent section, the determining unit 212 determines that the principal axis in the determination target section is advantageous for the movement of the specific part in the determination target section. On the other hand, when the evaluation value of the determination target section is equal to or smaller than the evaluation value of the corresponding subsequent section, the determining unit 212 determines that the principal axis in the subsequent section is advantageous for the movement of the specific part in the determination target section.

For example, while determining the advantageous axis for the movement of the specific part at a desired determination timing T, the section setting unit 210 starts the setting of a determination target section at the desired determination timing T and finalizes the determination target section before the elapse in the predetermined time period $T_{Oa}$ from the desired determination timing T. Then, at that point of time (i.e., at the point of time of elapse in the predetermined time period $T_{Oa}$), the determining unit 212 finalizes the axis that is advantageous for the movement of the specific part in the determination target section at the desired determination timing T. Herein, the desired determination timing points to the setting start timing for setting a determination target section by the section setting unit 210.

Figure 12:
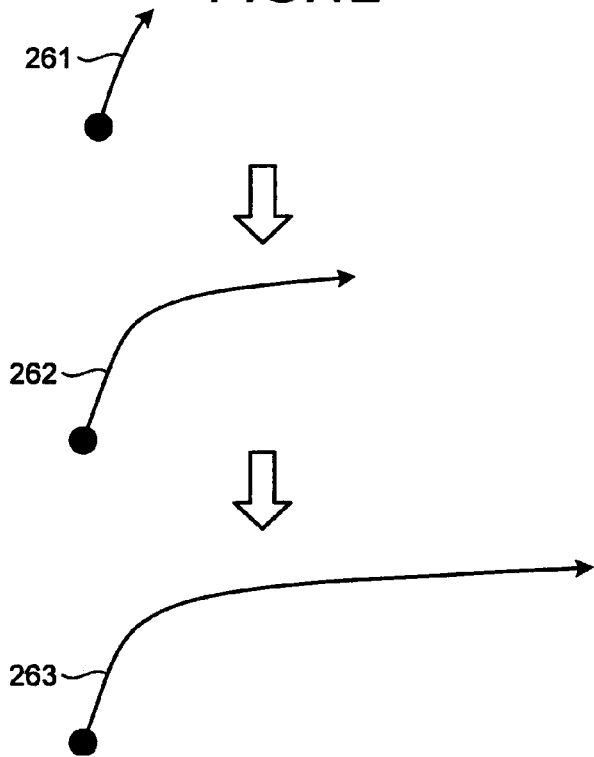
FIG. 12 is a diagram illustrating another example of a gesture performed by the specific part according to the second embodiment.

FIG. 12 is a diagram illustrating another example of a gesture performed by the specific part according to the second embodiment. In the example illustrated in FIG. 12, the specific part follows a trajectory in the upward direction (trajectory 261) and then follows a trajectory in the right-hand direction (trajectories 262 and 263). Meanwhile, in the example illustrated in FIG. 12, the movement distance is used as the evaluation value.

During the trajectory 261 (hereinafter, referred to as "timing $T_{261}$"), the trajectory in the upward direction serves as the determination target section. Herein, assume that, before the elapse in the predetermined time period $T_{Oa}$, the trajectory changes from the trajectory 262 to the trajectory 263. In that case, as far as the information about a determination target section and the corresponding subsequent section is concerned at the time when the desired determination timing (i.e., the setting start timing for setting a determination target section) is the timing $T_{261}$; during the trajectory 263, that is, at the timing obtained as (timing $T_{261}$)+(timing $T_{Oa}$), the concerned information indicates that the trajectory in the upward direction still serves as the determination target section and the trajectory in the right-hand direction serves as the corresponding subsequent section. Since the movement distance of the trajectory in the right-hand direction is exceeding the movement distance of the trajectory in the upward direction, the determining unit 212 determines that the evaluation value of the trajectory in the right-hand direction is higher than the evaluation value of the trajectory in the upward direction. Accordingly, the determining unit 212 determines that the axis in the horizontal direction, which is the principal axis in the subsequent section, is advantageous for the movement of the specific part in the determination target section. As a result, any gesture in the vertical direction is considered as noise, and the horizontal direction is determined to be advantageous as far as the entire gesture is concerned.

Meanwhile, in the case when the section setting unit 210 keeps on outputting the information about a determination target section and the corresponding subsequent section; the determining unit 212 can keep on determining the axis, which is advantageous for the movement of the specific part in the determination target section, for a predetermined time period until the determination target section and the subsequent section are finalized. In this case, the determining unit 212 can also calculate the progress rate of the predetermined time. Herein, the progress rate can be a value obtained by interpolation to 0 of the timing $T_i$ that is the point of time of starting the setting of a determination target section, interpolation to 1 of the timing $T_i+T_{Oa}$ that is the point of time of elapse in the predetermined time period $T_{Oa}$, and linear interpolation of the period from the timing $T_i$ to the timing $T_i+T_{Oa}$. Thus, for a timing t where $T_i \leq T_i+\leq T_{Oa}$; the progress rate is $(t-T_i)/T_{Oa}$.

FIG. 13 is a diagram for illustrating an example of axes each being advantageous at a particular progress rate determined by the determining unit 212 according to the second embodiment. In the example illustrated in FIG. 13, when the desired determination timing is the timing $T_i$, the first axis is advantageous for the movement of the specific part in the determination target section during the timing $T_i$ to the timing $T_i+20$ (i.e., during the progress rate of 0 to 0.30) and the second axis is advantageous for the movement of the specific part in the determination target section during the timing $T_i+30$ to the timing $T_i+70$ (i.e., during the progress rate of 0.45 to 1.00). As a result, when the desired determination timing is the timing $T_i$, the second axis is finalized as the axis that is advantageous for the movement of the specific part in the determination target section.

Meanwhile, the progress rate can be based on the timing of obtaining each position that is obtained by the obtaining unit 102. Moreover, only in the case when the advantageous axis for the movement of the specific part is determined for a particular determination target section, the determining unit 212 can be configured to keep on determining the advantageous axis and calculating the progress rate of a predetermined time period. Herein, a particular determination target section either points to a determination target section to be subjected to the determination of the advantageous axis immediately after an advantageous axis has been finalized, or points to a determination target section in which the movement vector has the movement velocity or the movement distance equal to or greater than a threshold value.

FIG. 14 is a diagram for illustrating another example of axes each being advantageous at a particular progress rate determined by the determining unit 212 according to the second embodiment. In the example illustrated in FIG. 14, sequential determination of advantageous axes and calculation of progress rates in predetermined time periods is performed only when the axis advantageous to the movement of the specific part is determined for a determination target section that is to be subjected to such determination immediately after an advantageous axis has been finalized.

During the timing $T_i$ to the timing $T_i+70$ (i.e., during the progress rate 0 to 1.00), the condition is identical to that illustrated in FIG. 13. Regarding the determination target section for which the determination of advantageous axis is started at the timing $T_i$, the second axis is finalized as the advantageous axis at the timing $T_i+70$. For that reason, regarding the determination target section for which the determination of advantageous axis is started at the timing $T_i+80$, the determining unit 212 performs sequential determination of the advantageous axis and calculates the progress rate of a predetermined time period.

In the determination target section during the timing $T_i+80$ to the timing $T_i+150$ (i.e., during the progressive rate of 0 to 1.00), the second axis is the advantageous axis for the movement of the specific part. As a result, the second axis is finalized as the axis that is advantageous for the movement of the specific part in the determination target section for which the determination of the advantageous axis is started at the timing $T_i+80$.

Regarding the determination target section for which the determination of the advantageous axis is started at the timing $T_i+80$, the second axis is finalized to be the advantageous axis at the timing $T_i+150$. Hence, regarding the determination target section for which the determination of advantageous axis is started at the timing $T_i+160$, the determining unit 212 performs sequential determination of the advantageous axis and calculates the progress rate of a predetermined time period.

When the determining unit 212 performs sequential determination, within a predetermined time period, of the advantageous axis for the movement of the specific part in a determination target section, the presenting unit 214 can be configured to further perform supplementary presentation with a predetermined time period, that is, depending on the determination result before the determination target section and the corresponding subsequent section are finalized. In the second embodiment, when the setting of a determination target section are started at the timing $T_i$, the advantageous axis for the movement of the specific part in that determination target section is finalized by the timing $T_i+T_{0a}$. Therefore, the presenting unit 214 performs supplementary presentation depending on the determination result obtained by the determining unit 212 between the timings $T_i$ and $T_i+T_{0a}$. After the timing $T_i+T_{0a}$, by which the advantageous axis for the movement of the specific part is finalized, the presentation performed is identical to that described in the first embodiment.

Figure 15:
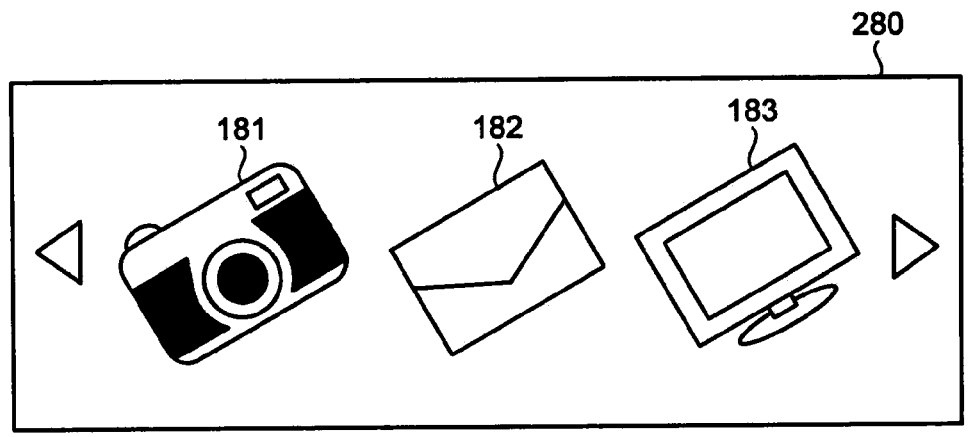
FIG. 15 is an example of supplementary presentation according to the second embodiment.

FIG. 15 is an example of the supplementary presentation performed by the presenting unit 214 according to the second embodiment. For example, with reference to FIG. 13, at the timing $T_i+30$, the advantageous axis for the movement of the specific part in a determination target section for which the settings are started at the timing $T_i$ changes from the first axis to the second axis. At that point of time, with reference to the screen 180 illustrated in FIG. 7 in which the object 181 is displayed on the left side, the object 182 is displayed in the center, and the object 183 is displayed on the right side; the presenting unit 214 can display a screen 280 as illustrated in FIG. 15 in which the objects 181 to 183 are tilted in the horizontal direction (in the left-hand direction). Then, at the timing $T_i+70$, once the second axis is finalized as the advantageous axis for the movement of the specific part in a determination target section for which such determination is started at the time timing $T_i$; the presenting unit 214 changes the screen 280 to the screen 180 illustrated in FIG. 7 in which the object 181 is displayed on the left side, the object 182 is displayed in the center, and the object 183 is displayed on the right side. As a result, it becomes possible to notify the user about the axis that is being determined as the advantageous axis.

Figure 16:
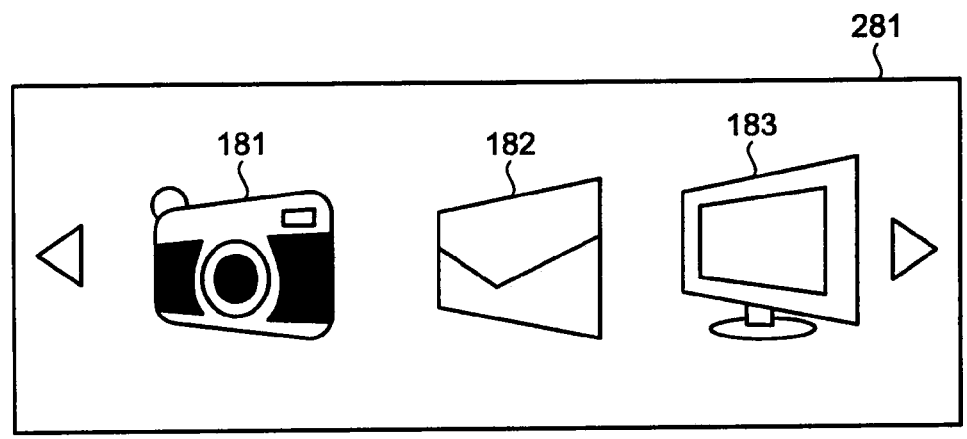
FIG. 16 is a diagram illustrating another example of supplementary presentation according to the second embodiment.
Figure 17:
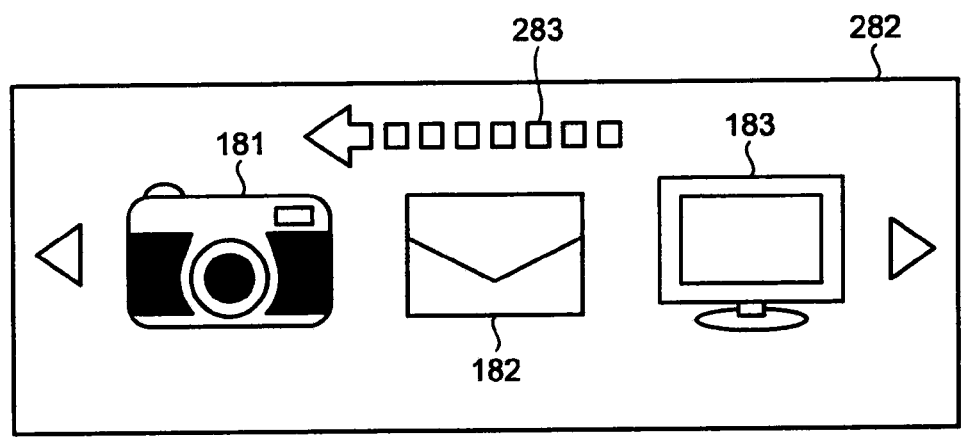
FIG. 17 is a diagram illustrating still another example of supplementary presentation according to the second embodiment.

FIGS. 16 and 17 are diagrams illustrating other examples of the supplementary presentation performed by the presenting unit 214 according to the second embodiment. With reference to the screen 180 illustrated in FIG. 7 in which the object 181 is displayed on the left side, the object 182 is displayed in the center, and the object 183 is displayed on the right side; the presenting unit 214 can be configured to display, not the screen 280 illustrated in FIG. 15, but a screen 281 in which the objects 181 to 183 are rotated in horizontal direction (the left-hand direction) or a screen 282 in which an arrow 283 is additionally displayed to indicate the horizontal direction (the left-hand direction).

Figure 18:
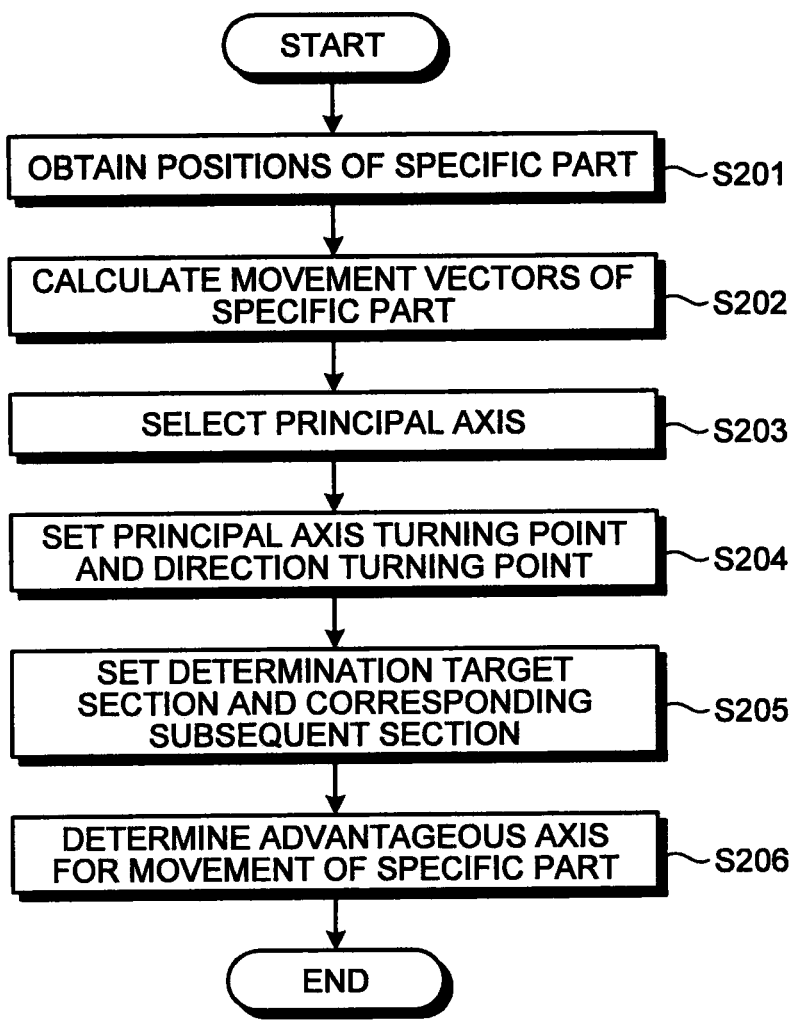
FIG. 18 is a flowchart for explaining an exemplary sequence of operations performed in the recognition apparatus according to the second embodiment.

FIG. 18 is a flowchart for explaining an exemplary sequence of operations performed in the recognition apparatus 200 according to the second embodiment.

Herein, the operations from Steps S201 to S204 are identical to the operations from Steps S101 to S104 in the flowchart illustrated in FIG. 8.

Subsequently, the section setting unit 210 sets a determination target section, in which a start point is either set to the latest principal axis turning point when principal axis turning points are present or set to the initially-obtained position when principal axis turning points are absent, and in which an end point is either set to the principal axis turning point present immediately after the start point, when the principal axis turning points are present subsequent to the start point but before the elapse in a predetermined time period since the setting of the start point, or set to the latest point that indicates the most-recently obtained position before the elapse in a predetermined time period, when no principal axis turning point is present subsequent to the start point but before the elapse in the predetermined time. Moreover, the section setting unit 210 sets a subsequent section, in which a start point is set to the end point of the abovementioned determination target section and in which an end point is either set to the direction turning point present immediately after the start point when such the direction turning points are present subsequent to the start point or set to the latest point when the latest point is present subsequent to the start point (Step S205).

Then, the determining unit 212 calculates an evaluation value of the determination target section and an evaluation value of the corresponding subsequent section and, based on those evaluation values, determines which of the first axis and the second axis is advantageous for the movement of the specific part in the determination target section (Step S206).

Every time the obtaining unit 102 obtains the latest position of the specific part of the photographic subject (Step S201), the operations from Step S202 to Step S206 are performed, and the presenting unit 214 performs presentation according to the determination result obtained by the determining unit 212.

Figure 19:
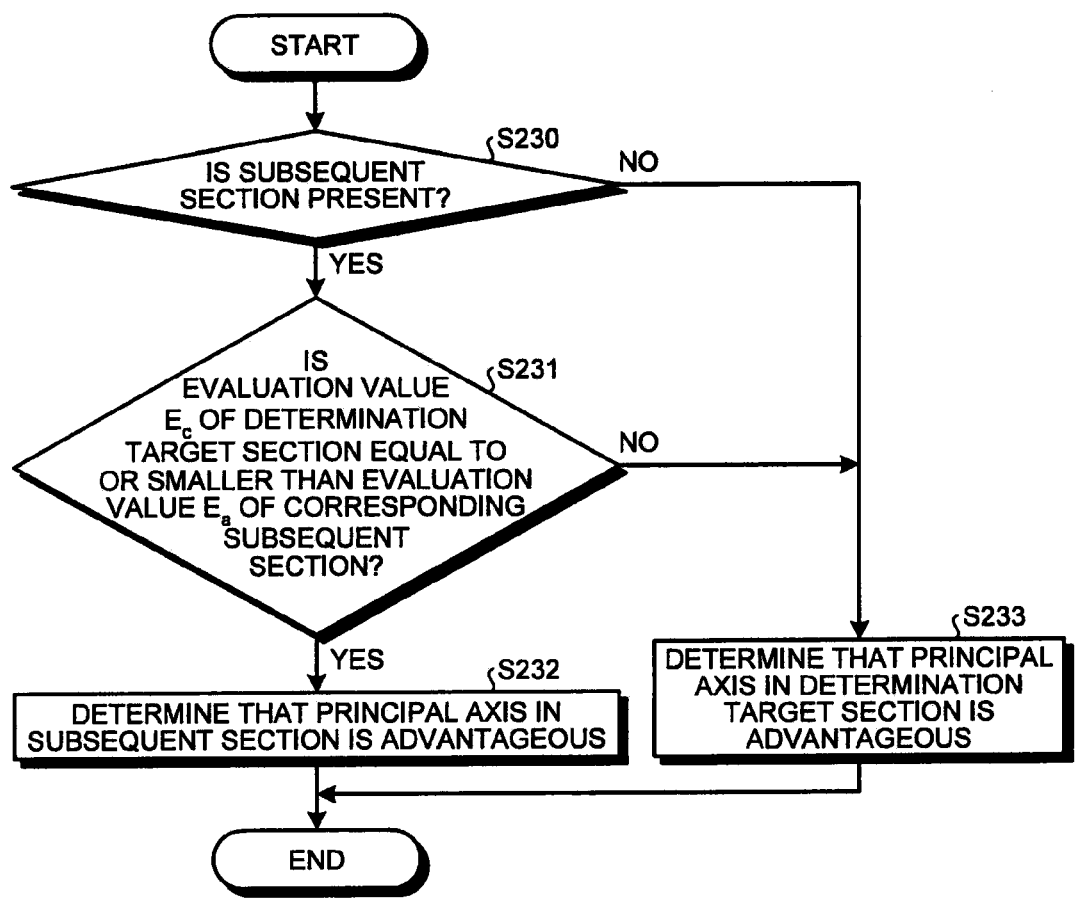
FIG. 19 is a flowchart for explaining an exemplary sequence of operations performed by a determining unit in the recognition apparatus according to the second embodiment.

FIG. 19 is a flowchart for explaining an exemplary sequence of operations performed by the determining unit 212 in the recognition apparatus 200 according to the second embodiment.

Firstly, the determining unit 212 checks whether or not a subsequent section is present (Step S230).

When a subsequent section is present (Yes at Step S230), the determining unit 212 calculates an evaluation value $E_c$ of the determination target section and an evaluation value $E_a$ of the subsequent section, and determines whether or not the evaluation value $E_c$ is equal to or smaller than the evaluation value $E_a$ (Step S231).

If the evaluation value $E_c$ is equal to or smaller than the evaluation value $E_a$ (Yes at Step S231), the determining unit 212 determines that the principal axis in the subsequent section is advantageous for the movement of the specific part in the determination target section (Step S232). That marks the end of the operations.

Meanwhile, if a subsequent section is absent (No at Step S230) or if the evaluation value $E_c$ is not equal to or smaller than the evaluation value $E_a$ (No at Step S231), the determining unit 212 determines that the principal axis in the determination target section is advantageous for the movement of the specific part in the determination target section (Step S233). That marks the end of the operations.

In the recognition apparatus 200, there are times when a determination target section and the corresponding subsequent section get finalized before the elapse in a predetermined time period since the start of setting of the determination target section, and there are times when the advantageous axis for the movement of the specific part in the determination target section gets finalized before the elapse in a predetermined time period. For example, before the elapse in a predetermined time period since the start of setting of a determination target section, if a principal axis turning point is present subsequent to the start point of the determination target period and if a direction turning point is present subsequent to the principal axis turning point; then the determination target section and the corresponding subsequent section get finalized before the elapse in a predetermined time period. Moreover, before the elapse in a predetermined time period since the start of setting of a determination target section, if the evaluation value of the subsequent section exceeds the evaluation value of the determination target section, the advantageous axis for the movement of the specific part in the determination target section gets finalized to the principal axis of the subsequent section. That eliminates the need of waiting for the elapse in the predetermined time period. Thus, the determining unit 212 can be configured to take these points into account while performing the operations.

Figure 20:
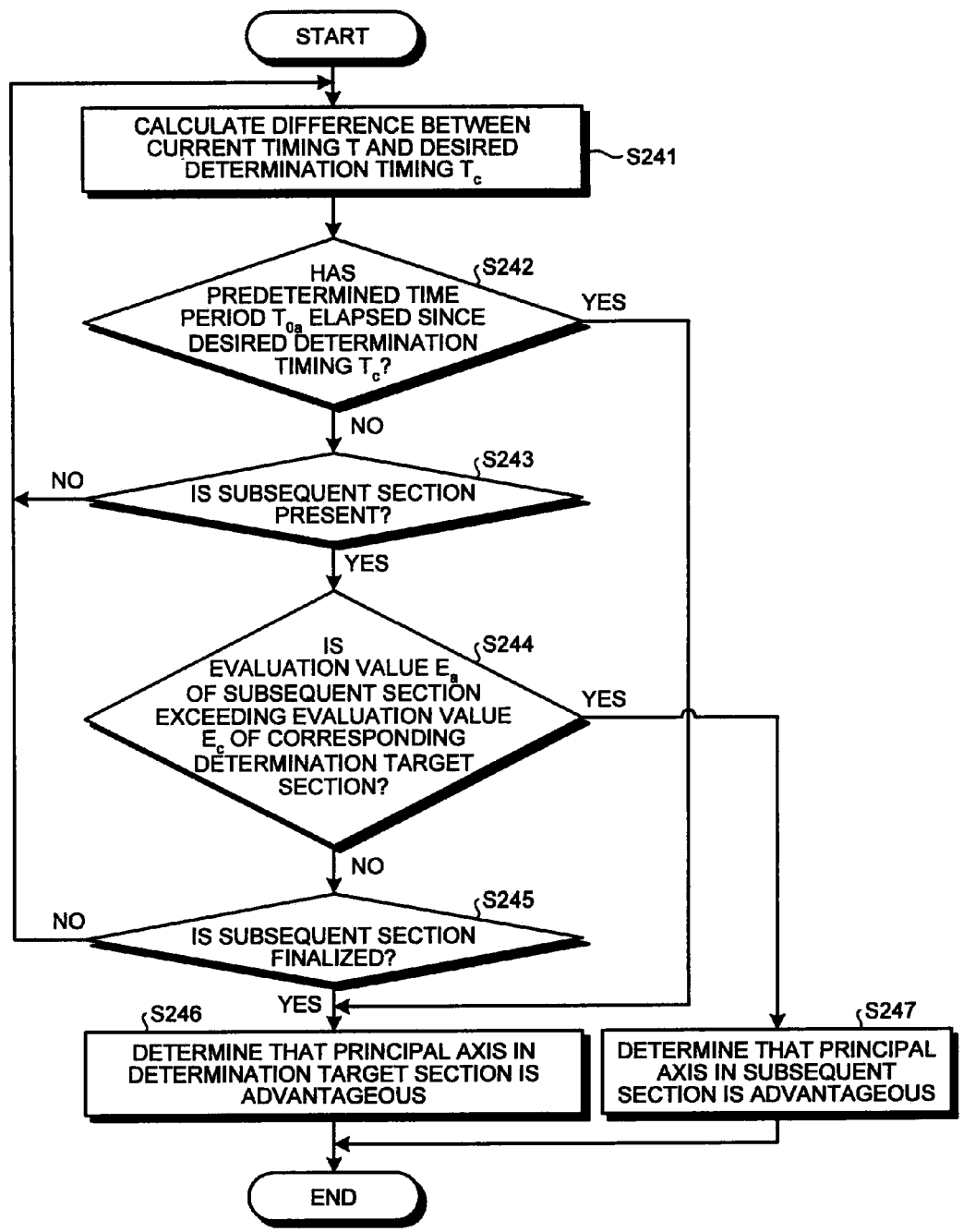
FIG. 20 is a flowchart for explaining another exemplary sequence of operations performed by the determining unit in the recognition apparatus according to the second embodiment.

FIG. 20 is a flowchart for explaining another exemplary sequence of operations performed by the determining unit 212 in the recognition apparatus 200 according to the second embodiment.

Firstly, the determining unit 212 calculates a difference between a current timing T and a desired determination timing $T_c$ that is the timing of starting the setting of a determination target section (Step S241), and determines whether or not a predetermined time period $T_{0a}$ has elapsed since the desired determination timing $T_c$ (Step S242).

If the predetermined time period $T_{0a}$ has not elapsed since the desired determination timing $T_c$ (No at Step S242), the determining unit 212 determines whether or not a subsequent section is present (Step S243). If a subsequent section is absent (No at Step S243), the system control returns to Step S241.

On the other hand, when a subsequent section is present (Yes at Step S243), the determining unit 212 calculates an evaluation value $E_c$ of the determination target section and an evaluation value $E_a$ of the subsequent section, and determines whether or not the evaluation value $E_a$ is exceeding the evaluation value $E_c$ (Step S244).

If the evaluation value $E_a$ is exceeding the evaluation value $E_c$ (Yes at Step S244), the determining unit 212 determines that the principal axis in the subsequent section is advantageous for the movement of the specific part in the determination target section (Step S247). That marks the end of the operations.

In contrast, if the evaluation value $E_a$ is not greater than the evaluation value $E_c$ (No at Step S244), the determining unit 212 checks whether or not the subsequent section has been finalized (Step S245). More particularly, the determining unit 212 checks whether or not the end point of the subsequent section is a direction turning point.

If the subsequent section has been finalized (Yes at Step S245), that is, if the end point of the subsequent section is a direction turning point; because of the fact that the evaluation value $E_a$ does not exceed the evaluation value $E_c$, the determining unit 212 determines that the principal axis in the determination target section is advantageous for the movement of the specific part in the determination target section (Step S246). That marks the end of the operations.

On the other hand, if the subsequent section has not been finalized (No at Step S245), that is, if the end point of the subsequent section is not a direction turning point; the system control returns to Step S241.

Hence, when the predetermined time period $T_{0a}$ has elapsed since the desired determination timing $T_c$ (Yes at Step S242), either a subsequent section is absent or the evaluation value $E_a$ does not exceed the evaluation value $E_c$. In that case, the determining unit 212 determines that the principal axis in the determination target section is advantageous for the movement of the specific part in the determination target section (Step S246). That marks the end of the operations.

Meanwhile, when a subsequent section is present (Yes at Step S243), it means that the determination target section has been finalized. That enables the usage of the evaluation value $E_c$ that has been already calculated. Thus, the evaluation value $E_c$ need not be calculated again.

As described above, in the second embodiment, the gesture in a determination target section is recognized using the corresponding subsequent section. Thus, according to the second embodiment, it becomes possible to determine whether or not the gesture in a determination target section is noise. Because of that, even if a movement representing noise is included in a gesture, such movement can be recognized correctly thereby enabling prevention of a decline in the recognition accuracy.

For example, if a movement representing noise is included at the start of a gesture, then the noise portion represents the determination target section and the portion of the normal gesture represents the subsequent section. There, by referring to the subsequent section, it becomes possible to determine that the gesture in the determination target section is noise and to make substitution with the movement direction of the normal gesture in the subsequent section. In this way, even when a movement representing noise is included in a gesture, the noise can be recognized in a correct manner.

Third Embodiment

In a third embodiment, the explanation is given for an example in which the gesture in a determination target section is recognized by making use of the corresponding previous section as well as the corresponding subsequent section; and in which the direction indicated along the advantageous axis, which is advantageous for the movement of the specific part, or the specific bodily part, in the determination target section, is also recognized. In the following explanation, the focus is on elaborating the differences with the first embodiment. Moreover, the constituent elements having identical functions to the functions described in the first embodiment are referred to by the same names and reference numerals, and the explanation thereof is not repeated.

Figure 21:
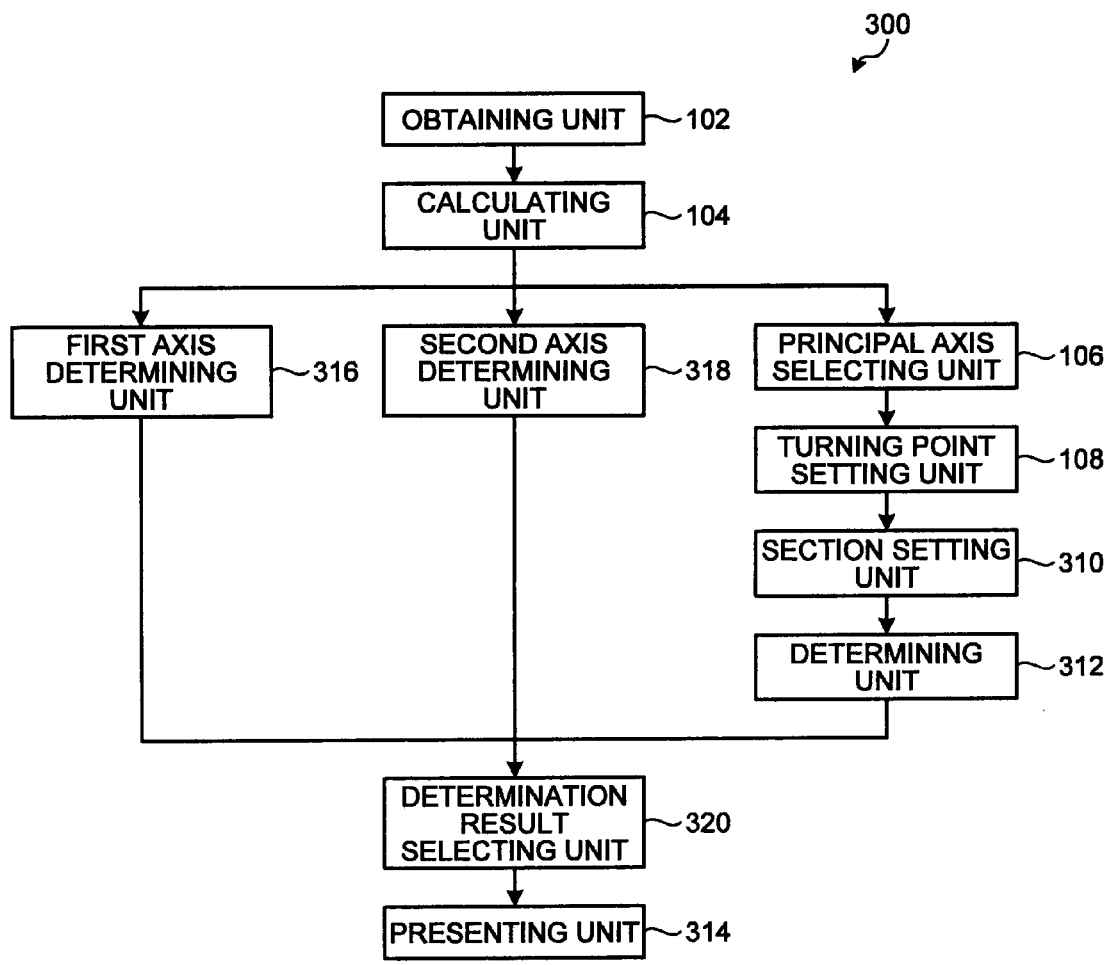
FIG. 21 is a configuration diagram illustrating an example of a recognition apparatus according to a third embodiment.

FIG. 21 is a configuration diagram illustrating an example of a recognition apparatus 300 according to the third embodiment. In the recognition apparatus 300 according to the third embodiment; a section setting unit 310, a determining unit 312, and a presenting unit 314 are different as compared to the first embodiment. Besides, the recognition apparatus 300 further includes a first axis determining unit 316, a second axis determining unit 318, and a determination result selecting unit 320.

The section setting unit 310 has the combined functions of the section setting unit 110 according to the first embodiment and the section setting unit 210 according to the second embodiment.

That is, the section setting unit 310 sets a determination target section, in which a start point is either set to the latest principal axis turning point when principal axis turning points are present or set to the initially-obtained position when principal axis turning points are absent, and in which an end point is set to the latest point that indicates the most-recently obtained position. Moreover, the section setting unit 310 sets a previous section, in which an end point is set to the start point of the determination target section and in which a start point is either set to the direction turning point present immediately before the end point when the direction turning points are present before the end point or set to the initial point when no direction turning point is present before the end point. At this point of time, the previous section does get finalized but the determination target section is not yet finalized.

Then, the section setting unit 310 updates the end point either to the principal axis turning point present immediately after the start point, when the principal axis turning points are present subsequent to the start point but before the elapse in a predetermined time period since the setting of the start point, or to the latest point that indicates the most-recently obtained position after the elapse in a predetermined time period, when no principal axis turning point is present subsequent to the start point but before the elapse in the predetermined time. Moreover, the section setting unit 310 sets a subsequent section, in which a start point is set to the end point of the updated determination target section and in which an end point is either set to the direction turning point present immediately after the start point when the direction turning points are present subsequent to the start point or set to the latest point present after the elapse in a predetermined time period when latest points are present subsequent to the start point.

As described above, the section setting unit 310 has the combined functions of the section setting unit 110 according to the first embodiment and the section setting unit 210 according to the second embodiment. Thus, the determining unit 312 calculates an evaluation value of the determination target section, an evaluation value of the corresponding previous section, and an evaluation value of the corresponding subsequent section; and, based on those evaluation values, determines which of the first axis and the second axis is advantageous for the movement of the specific part in the determination target section.

More particularly, if the evaluation value of the determination target section is exceeding the evaluation value of the previous section or if the previous section is absent, as well as if the evaluation value of the determination target section is exceeding the evaluation value of the subsequent section or if the subsequent section is absent; the determining unit 312 determines that the principal axis in the determination target section is advantageous for the movement of the specific part in the determination target section.

When the evaluation value of the determination target section is equal to or smaller than the evaluation value of the previous section, the determining unit 312 determines that the principal axis in the previous section is advantageous for the movement of the specific part in the determination target section. As a result, without having to wait for the elapse in a predetermined time period, the principal axis in the previous section can be determined to be advantageous for the movement of the specific part in the determination target section.

When the evaluation value of the determination target section is equal to or smaller than the evaluation value of the subsequent section, the determining unit 312 determines that the principal axis in the subsequent section is advantageous for the movement of the specific part in the determination target section.

The first axis determining unit 316 and the second axis determining unit 318 respectively determine the advantageous direction along the first axis and the advantageous direction along the second axis by referring to the movement vectors calculated by the calculating unit 104. Thus, the first axis determining unit 316 determines the direction indicated along the first axis and the second axis determining unit 318 determines the direction indicated along the second axis. For example, if the first axis serves as the axis in the vertical direction, then the first axis determining unit 316 determines whether the upward direction or the downward direction is indicated along the first axis. Similarly, if the second axis serves as the axis in the horizontal direction, then the second axis determining unit 318 determines whether the left-hand direction or the right-hand direction is indicated along the second axis. In the following explanation, indicating a particular direction along an axis is referred to as performing "feed action", in which the user performs an action of waving the specific part such as a hand so as to indicate the direction of waving.

In order to determine the direction along the second axis in which a feed action is performed, the second axis determining unit 318 can implement the following determination method. Herein, although the explanation is given with reference to the second axis determining unit 318, the same explanation is also applicable to the first axis determining unit 316.

When the velocity of the second axis component of a movement vector (the inner product of the movement vector and the second axis) calculated by the calculating unit 104 becomes equal to or greater than the a threshold value, the second axis determining unit 318 determines that a feed action is performed in the direction of the movement vector in the second axis.

Herein, it is assumed that a position $P_s$, which is the start point of a movement vector $R_s$ and which is obtained by the obtaining unit 102 at a timing $T_s$, has coordinates $(x_s, y_s)$. Similarly, it is assumed that a position $P_{s+1}$, which is the end point of the movement vector $R_s$ and which is obtained by the obtaining unit 102 at a timing $T_{s+1}$, has coordinates $(x_{s+1}, y_{s+1})$. In that case, the second axis component (the x-axis component) of the movement vector $R_s$ becomes $x_{s+1}-x_s$, and a second axis component $S_s$ of the movement vector $R_s$ per unit of time becomes $S_s=(x_{s+1}-x_s)/(T_{s+1}-T_s)$.

Moreover, a velocity $V_s$ of the second axis component of the movement vector $R_s$ is expressed as $V_s=|S_s|$. The second axis component of the movement vector $R_s$ has the positive direction if the sign of $S_s$ is positive or has the negative direction if the sign of $S_s$ is negative. Hence, when the velocity $V_s$ becomes equal to or greater than a threshold value, the second axis determining unit 318 determines that, if the sign of $S_s$ is positive, a feed action is performed in the positive direction along the second axis and determines that, if the sign of $S_s$ is negative, a feed action is performed in the negative direction along the second axis.

Once it is determined that a feed action has been performed, the second axis determining unit 318 can stop performing determination until there is a change in the direction along the second axis component of the movement vector and can make use of the determination result. When there is a change in the sign of $S_s$, the second axis determining unit 318 determines that a change has occurred in the direction along the second axis component of the movement vector. Meanwhile, the second axis determining unit 318 can have zeros sandwiched in between until there is a change in the sign of $S_s$. For example, if the sign of $S_{s-2}$ is positive, the sign of $S_{s-1}$ is 0, and the sign of $S_s$ is negative; then, at the point of time of $S_{s-1}$, the second axis determining unit 318 does not determine that there is a change in the direction along the second axis component. Rather, it is at the point of time of $S_s$ that the second axis determining unit 318 determines that there is a change in the direction along the second axis component.

Moreover, upon determining that a feed action has been performed, in order to ensure that that a feed action in the opposite direction (hereinafter, referred to as "return action") is not determined to have been performed, the second axis determining unit 318 can be configured to ignore a return action performed immediately after the determination that a feed action has been performed.

Moreover, alternatively, the second axis determining unit 318 can be firstly configured to not determine that a feed action in the opposite direction (hereinafter, referred to as "backswing action") is performed prior to determining that a feed action has been performed. Secondly, upon determining that a feed action has been performed, the second axis determining unit 318 can be configured to not determine that a feed action in the opposite direction (hereinafter, referred to as "return action") is performed. In that case, the second axis determining unit 318 refers to the previous section and to the subsequent section of an operation section that serves as the determination target section, and accordingly determines whether or not a feed action was performed in that operation section. Herein, an operation section points to a section in which a start point is either set to a second-axis direction turning point when such a second-axis direction turning point is present at which the direction along the second axis component of the movement vector changes, or set to the initial point indicating the initially-obtained position when a second-axis direction turning point is absent; and in which an end point is either set to a second-axis direction turning point present immediately after the start point, when such a second-axis direction turning point is present immediately after the start point, or set to the last point that indicates the latest obtained position, when a second-axis direction turning point is not present immediately after the start point.

More particularly, firstly, the second axis determining unit 318 sets second-axis direction turning points for the vectors calculated by the calculating unit 104. In the third embodiment, it is assumed that the second axis determining unit 318 determines in real time whether or not a feed action has been performed in an operation section. However, that is not the only possible case. Alternatively, that determination can also be done by performing batch processing, that is, after the gesture has been completed. Herein, for the sake of convenience, firstly, the explanation is given for the case when the determination of whether or not a feed action has been performed in an operation section is done by performing batch processing. Then, the explanation is given for the case when the determination is done in real time.

Figure 22:
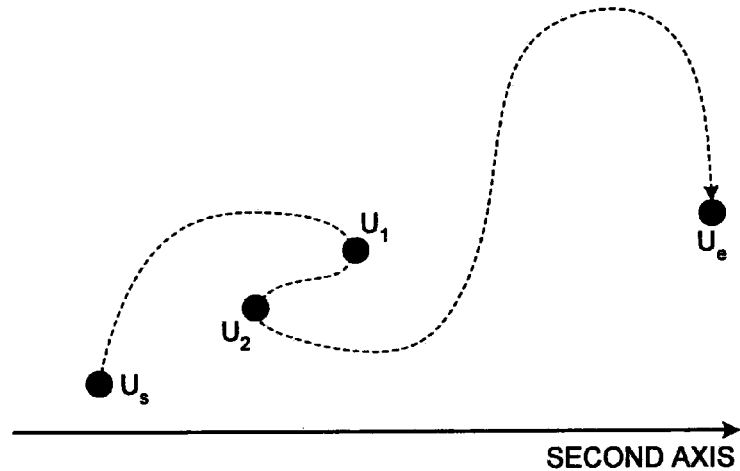
FIG. 22 is a diagram of an example of setting second-axis direction turning points according to the third embodiment.

FIG. 22 is a diagram of an example of setting second-axis direction turning points by the second axis determining unit 318 according to the third embodiment. In the example illustrated in FIG. 22, "$U_s$" indicates a start point that is the initially-obtained position obtained by the obtaining unit 102; "$U_1$" and "$U_2$" indicate second-axis direction turning points; and "$U_e$" indicates an end point that is the last position obtained by the obtaining unit 102. In that case, the second axis determining unit 318 sets the section $U_s$ to $U_1$, the section $U_1$ to $U_2$, and the section $U_2$ to $U_e$ as operation sections in that order; and determines whether or not a feed action has been performed in each of those operation sections.

More particularly, when the section $U_s$ to $U_1$ is set as the operation section, the second axis determining unit 318 sets the section $U_1$ to $U_2$ as the corresponding subsequent section and calculates the evaluation values of the operation section and the subsequent section. Accordingly, the second axis determining unit 318 determines whether or not a feed action was performed in the section $U_s$ to $U_1$ set as the operation section. In an identical manner, when the section $U_1$ to $U_2$ is set as the operation section, the second axis determining unit 318 sets the section $U_s$ to $U_1$ as the corresponding previous section and sets the section $U_2$ to $U_e$ as the corresponding subsequent section, and calculates the evaluation values of the operation section, the previous section, and the subsequent section. Accordingly, the second axis determining unit 318 determines whether or not a feed action was performed in the section $U_1$ to $U_2$ set as the operation section. Similarly, when the section $U_2$ to $U_e$ is set as the operation section, the second axis determining unit 318 sets the section $U_1$ to $U_2$ as the corresponding previous section and calculates the evaluation values of the operation section and the previous section. Accordingly, the second axis determining unit 318 determines whether or not a feed action was performed in the section $U_2$ to $U_e$ set as the operation section.

Herein, in order to determine that a feed action was performed in an operation section, the following conditions need to be satisfied: an evaluation value $E_n$ of that operation section is equal to or greater than a threshold value; and the evaluation value $E_n$ of that operation section is exceeding an evaluation value $E_m$ of the corresponding previous section and greater than an evaluation value $E_1$ of the corresponding subsequent section. The evaluation values mentioned above are identical to the evaluation values used by the determining unit 312. However, herein, the movement distance can be considered to be the sum of the first axis components of the movement vectors in the operation section (i.e., modulus of the inner products of the movement vectors and the first axis). Moreover, the movement velocity can be considered to be the maximum velocity among the velocities of the first axis components of the movement vectors in the operation section or can be considered to be the average velocity of the velocities of the movement vectors that are equal to or greater than a predetermined threshold value. Furthermore, the movement acceleration can be considered to be the maximum rate of acceleration from among the rates of acceleration of the first axis components of the movement vectors in the operation section or can be considered to be the average of the rates of acceleration of the movement vectors that are equal to or greater than a predetermined threshold value. Meanwhile, when a previous section is not present, the evaluation value $E_m$ becomes zero; and when a subsequent section is not present, the evaluation value $E_1$ becomes zero.

When the section $U_s$ to $U_1$ is set as the operation section, the second axis determining unit 318 does not set a previous section but sets the section $U_1$ to $U_2$ as the corresponds subsequent section. In that case, since the previous section is absent or since the evaluation value $E_n$ exceeds the evaluation value $E_1$, the second axis determining unit 318 considers the operation section to be at an advantage. Moreover, if the evaluation value $E_n$ is equal to or greater than a threshold value, then the second axis determining unit 318 determines that a feed action was performed in the section $U_s$ to $U_1$ set as the operation section. Meanwhile, the second axis determining unit 318 determines that an operation in the section $U_1$ to $U_2$ is a return action in the section $U_s$ to $U_1$.

When the section $U_1$ to $U_2$ is set as the operation section, the section $U_s$ to $U_1$ is set as the corresponding previous section, and the section $U_2$ to $U_e$ is set as the corresponding subsequent section; the evaluation value $E_n$ becomes equal to or smaller than the evaluation value $E_m$ and the evaluation value $E_n$. Hence, the second axis determining unit 318 determines that a feed action was not performed in the section $U_1$ to $U_2$ set as the operation section. That is, the second axis determining unit 318 determines that an operation in the section $U_1$ to $U_2$ is a return action in the section $U_s$ to $U_1$.

When the section $U_2$ to $U_e$ is set as the operation section, the second axis determining unit 318 sets the section $U_1$ to $U_2$ as the previous section and does not set a subsequent section. In this case, since the evaluation value $E_n$ exceeds the evaluation value $E_m$ or since the subsequent section is not present, the second axis determining unit 318 considers the operation section to be at an advantage. Moreover, if the evaluation value $E_n$ is equal to or greater than a threshold value, the second axis determining unit 318 determines that a feed action was performed in the section $U_2$ to $U_e$ set as the operation section. Meanwhile, the second axis determining unit 318 determines that an operation in the section $U_1$ to $U_2$ is a backswing action in the section $U_2$ to $U_e$.

Explained above was the case when the determination of whether or not a feed action was performed in an operation section is done by performing batch processing. In the case of performing such determination in real time, the task of setting a subsequent section leads to a delay by a predetermined time period in the determination of whether or not a feed action was performed in the corresponding operation section. Herein, that predetermined time period can be set to, for example, 0.6 seconds. Alternatively, the predetermined time period can be changed depending on the movement velocity of the specific part in the operation section. For example, as the movement velocity goes on increasing, the predetermined time period can be reduced. In such a case, during the predetermined time period, that is, during the period before the advantageous direction in the operation section is finalized; the second axis determining unit 318 can be configured to perform sequential determination of the advantageous direction in the operation section and to calculate the progress rate until the advantageous direction in the operation section is finalized. Herein, the progress rate can be expressed in an identical manner to the progress rate calculated by the determining unit 312. Moreover, only when there is a change in the direction determined to be advantageous in the operation section, the second axis determining unit 318 can be configured to output the advantageous direction (i.e., the determination result). Herein, although the explanation is given with reference to the second axis determining unit 318, the same explanation is also applicable to the first axis determining unit 316.

FIG. 23 is a diagram illustrating exemplary advantageous directions each corresponding to a progress rate and determined by the second axis determining unit 318 according to the third embodiment. During the timing $T_i$ to the timing $T_i+10$, the evaluation value of the operation section falls below a threshold value or becomes equal to smaller than the corresponding previous section. Hence, the corresponding progress rate is not calculated and the advantageous direction in the operation section in also not determined.

During the timing $T_i+20$ to the timing $T_i+80$ (i.e., during the progress rate of 0 to 0.90), the operation section becomes more advantageous as compared to the corresponding previous section, and the advantageous direction in the operation section is leftward. At the timing $T_i+90$ (i.e., at the progress rate of 1.00), the operation section becomes more advantageous as compared to the corresponding previous section as well as the corresponding subsequent section, and the advantageous direction in the operation section is finalized to the left-hand direction. As a result, the second axis determining unit 318 determines that a feed action in the left-hand direction was performed in the operation section.

During the timing $T_i+100$ to the timing $T_i+130$, either the operation section continues without modification even after the feed action has been performed, or the evaluation value of the operation section falls below a threshold value or becomes equal to or smaller than the corresponding previous section. Hence, the corresponding progress rate is not calculated and the advantageous direction in the operation section in also not determined.

During the timing $T_i+140$ to the timing $T_i+150$ (i.e., during the progress rate of 0 to 0.15), the operation section becomes more advantageous as compared to the corresponding previous section, and the advantageous direction in the operation section is rightward.

During the timing $T_i+160$ to the timing $T_i+220$ (i.e., during the progress rate of 0 to 0.90), the operation section becomes more advantageous as compared to the corresponding previous section as well as the corresponding subsequent section, and the advantageous direction in the operation section is leftward. Moreover, at the timing $T_{i+}230$ (i.e., at the progress rate of 1.00), the operation section becomes more advantageous as compared to the corresponding previous section as well as the corresponding subsequent section, and the advantageous direction in the operation section is finalized to the left-hand direction. As a result, the second axis determining unit 318 determines that a feed action in the left-hand direction was performed in the operation section.

Meanwhile, from the determination results regarding the first axis and the second axis, the determination result selecting unit 320 selects the determination result of the axis that is determined by the determining unit 312 to be advantageous for the movement of the specific part in a determination target section.

For example, assume that the advantageous axes determined by the determining unit 312 are as illustrated in FIG. 14, assume that the second axis determining unit 318 determines (finalizes) that a feed action in the left-hand direction was performed at the timing $T_i$, and assume that the first axis determining unit 316 determines (finalizes) that a feed action in the upward direction was performed at the timing $T_i$. In such a case, the determination result selected by the determination result selecting unit 320 is as follows.

Regarding the determination, started at the timing $T_i$, of the advantageous axis for the movement of the specific part in a determination target section, the determining unit 312 finalizes the second axis as the advantageous axis at the timing $T_i+70$. Therefore, at the timing $T_{i+}70$, the determination result selecting unit 320 selects the determination result at the timing $T_i$ as obtained by the second axis determining unit 318 at the timing $T_i$, and assumes that a feed action in the left-hand direction along the second axis was performed at the timing $T_i$.

Meanwhile, during the timing $T_i$ to the timing $T_1+20$, the determination result selecting unit 320 can be configured to select the determination result obtained by the first axis determining unit 316 obtained at the timing $T_i$. Similarly, during the timing $T_i+30$ to the timing $T_{i+}60$, the determination result selecting unit 320 can be configured to select the determination result obtained by the second axis determining unit 318 obtained at the timing $T_i$. That is, during the timing $T_i$ to the timing $T_{i+}20$, the feed action candidate at the timing $T_i$ can be set to the feed action in the upward direction along the first axis; and during the timing $T_i+30$ to the timing $T_i+60$, the feed action candidate at the timing $T_i$ can be set to the feed action in the left-hand direction along the second axis. Meanwhile, the feed action candidate can be a combination of the feed action and the progress rate. Regarding the direction of a feed action at a particular timing, it is possible to make use of the direction of the feed action in the axis determined by the determining unit 312 to be advantageous at that timing. Regarding the progress rate, the progress rate obtained by the determining unit 312 can be used.

FIG. 24 is a diagram of feed action candidates each selected corresponding to a progress rate by the determination result selecting unit 320. During the timing $T_i$ to the timing $T_i+20$ (i.e., during the progress rate of 0 to 0.30), the feed action candidate at the timing $T_i$ indicates a feed action in the left-hand direction. During the timing $T_i+30$ to the timing $T_i+60$ (i.e., during the progress rate of 0.45 to 0.90), the feed action candidate at the timing $T_i$ indicates a feed action in the upward direction. At the timing $T_i+70$ (i.e., at the progress rate of 1.00), the feed action candidate at the timing $T_i$ is finalized to a feed action in the upward direction.

In the case when each of the first axis determining unit 316 and the second axis determining unit 318 performs sequential determination of the axis advantageous in an operation section while calculating the progress rates; the determination result selecting unit 320 can be configured to select, from the determination results of the first axis and the second axis, the determination result and the progress rate for the advantageous axis for the movement of the bodily part in a determination target section determined by the determining unit 312.

Herein, the explanation is given for an example in which, as the determination result regarding the axis determined by the determining unit 312 to be advantageous for the movement of the specific part in a determination target section, the determination result selecting unit 320 selects the determination result regarding the second axis and the corresponding progress rate. However, the same explanation is also applicable to the case of selecting the determination result regarding the first axis and the corresponding progress rate.

Once the second axis determining unit 318 starts calculating the progress rate, the determining unit 312 also starts calculating the progress rate. That is, once the second axis determining unit 318 starts calculating the progress rate at the timing $T_j$, the determining unit 312 also starts calculating the progress rate at the timing $T_j$. For a certain period of time, the calculation of progress rates is carried on.

Herein, in order to simplify the explanation, during the progress rate of 0.00 to 0.99 calculated by the determining unit 312, if the determining unit 312 has determined that the second axis is the advantageous axis for the movement of the specific part in a determination target section, it is assumed that the determining unit 312 outputs a notification that the second axis is the advantageous axis candidate. Moreover, at the progress rate of 1.00 calculated by the determining unit 312, if the determining unit 312 has determined that the second axis is the advantageous axis for the movement of the specific part in a determination target section, it is assumed that the determining unit 312 outputs a notification that the second axis is finalized as the advantageous axis. In a case other than the abovementioned cases, that is, during the progress rate of 0.00 to 1.00 calculated by the determining unit 312, if the determining unit 312 has determined that the first axis is the advantageous axis for the movement of the specific part in a determination target section, it is assumed that the determining unit 312 does not perform any output.

During a predetermined progress rate (for example, 0.00 to 0.25) calculated by the second axis determining unit 318, once the determining unit 312 outputs that the second axis is the advantageous axis candidate or that the second axis is finalized as the advantageous axis; the determination result selecting unit 320 starts, at that point of time as the start timing, the selection of the determination result of the second axis determining unit 318 and the corresponding progress rate. In any other case, the determination result selecting unit 320 does not select the determination result of the second axis determining unit 318 and the corresponding progress rate.

Then, if the determining unit 312 stops performing the output during the period from the start timing of starting the selection until the timing at which the progress rate calculated by the second axis determining unit 318 becomes 1.00, then the determination result selecting unit 320 stops the selection at the timing at which the determining unit 312 has stopped performing the output.

Moreover, assume that, during the period from the start timing of starting the selection until the timing at which the progress rate calculated by the second axis determining unit 318 becomes 1.00, the determining unit 312 keeps on performing the output and outputs a notification that the second axis is finalized as the advantageous axis. In that case, irrespective of the determination result obtained subsequently by the second axis determining unit 318, the determination result selecting unit 320 keeps on selecting the progress rates calculated by the second axis determining unit 318. Then, at the point of time when the progress rate becomes 1.00, the second axis determining unit 318 finalizes that a feed action has been performed in the direction indicated by the determination result of the second axis determining unit 318.

Furthermore, assume that, even when the period from the start timing of starting the selection reaches the timing at which the progress rate calculated by the second axis determining unit 318 becomes 1.00, the determining unit 312 is still outputting a notification that the second axis is the advantageous axis candidate. In that case, until the determining unit 312 outputs a notification that the second axis is finalized as the advantageous axis, the determination result selecting unit 320 keeps on selecting the progress rate of 0.99 as the progress rate calculated by the second axis determining unit 318. Once the determining unit 312 outputs a notification that the second axis is finalized as the advantageous axis, the determination result selecting unit 320 selects the progress rate of 1.00 and finalizes that a feed action has been performed in the direction indicated by the second axis determining unit 318. However, while the determination result selecting unit 320 keeps on selecting the progress rate of 0.99 as the progress rate calculated by the second axis determining unit 318; if the determining unit 312 stops performing the output, then the determination result selecting unit 320 stops the selection at the timing at which the determining unit 312 has stopped performing the output.

Herein, the presenting unit 314 performs presentation according to the selection result obtained by the determination result selecting unit 320. In the case when, from the determination results regarding the first axis and the second axis, the determination result selecting unit 320 selects the determination result of the advantageous axis for the movement of the specific part in a determination target section determined by the determining unit 312 and selects the corresponding progress rate; the presenting unit 314 can perform supplementary presentation, as explained in the second embodiment, until the selection result is finalized, that is, while the selection is underway. Once the selection result is finalized, the subsequent presentation is identical to that explained in the first embodiment.

Figure 25:
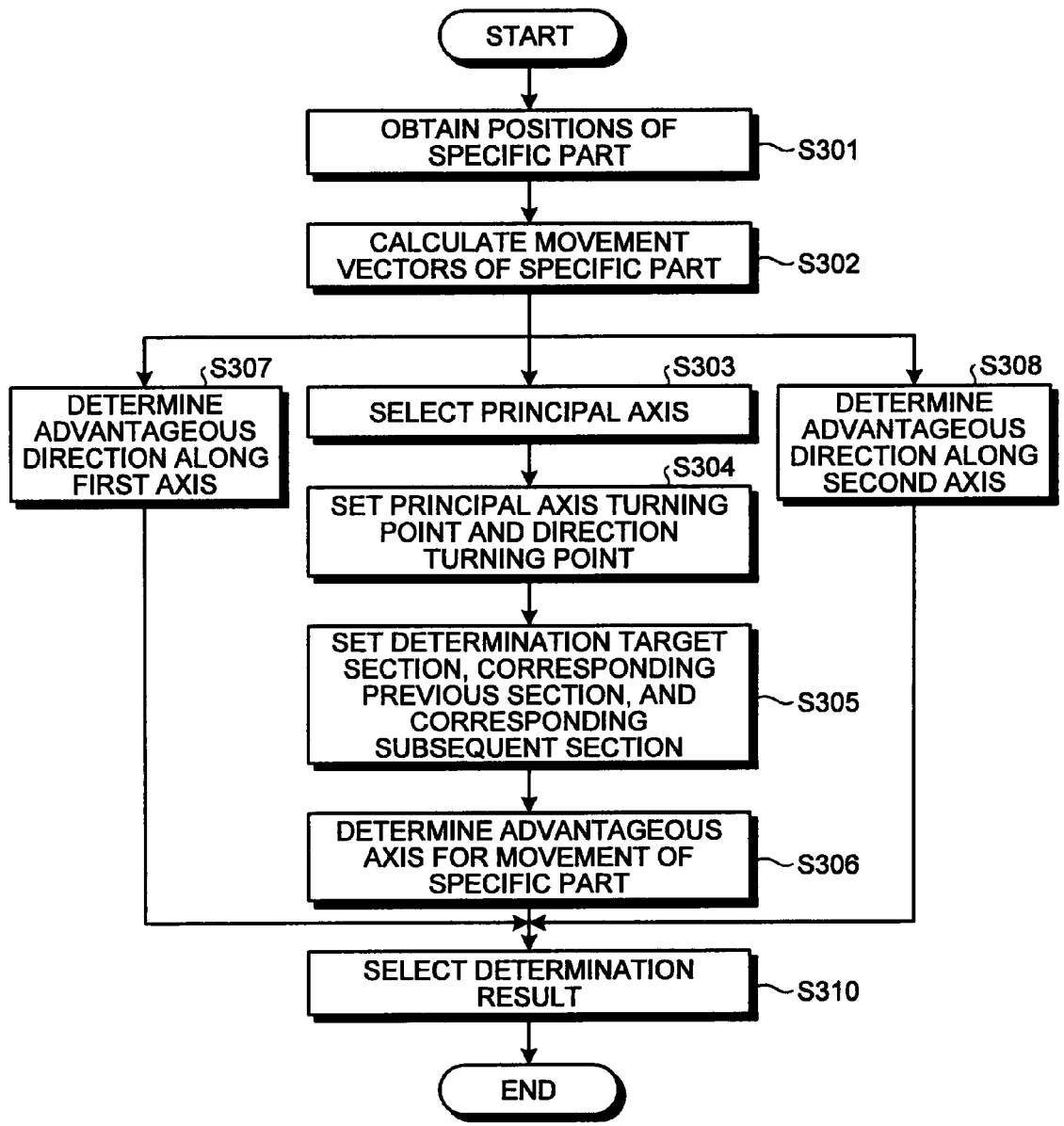
FIG. 25 is a flowchart illustrating an exemplary sequence of operations performed in the recognition apparatus according to the third embodiment.

FIG. 25 is a flowchart illustrating an exemplary sequence of operations performed in the recognition apparatus 300 according to the third embodiment.

Herein, the operations from Steps S301 to S304 are identical to the operations from Steps S101 to S104 in the flowchart illustrated in FIG. 8.

Subsequently, the section setting unit 310 sets a determination target section, in which a start point is either set to the latest principal axis turning point when principal axis turning points are present or set to the initially-obtained position when principal axis turning points are absent, and in which an end point is set to the latest point that indicates the most-recently obtained position. Moreover, the section setting unit 310 sets a previous section, in which an end point is set to the start point of the determination target section and in which a start point is either set to the direction turning point present immediately before the end point when the direction turning points are present before the end point or set to the initial point when no direction turning point is present before the end point. Then, the section setting unit 310 updates the end point either to the principal axis turning point present immediately after the start point, when the principal axis turning points are present subsequent to the start point but before the elapse in a predetermined time period since the setting of the start point, or to the latest point that indicates the most-recently obtained position after the elapse in a predetermined time period, when no principal axis turning point is present subsequent to the start point but before the elapse in the predetermined time. Furthermore, the section setting unit 310 sets a subsequent section, in which a start point is set to the end point of the updated determination target section and in which an end point is either set to the direction turning point present immediately after the start point when the direction turning points are present subsequent to the start point or set to the latest point present after the elapse in a predetermined time period when latest points are present subsequent to the start point (Step S305).

Then, the determining unit 312 calculates an evaluation value of the determination target section, an evaluation value of the corresponding previous section, and an evaluation value of the corresponding subsequent section; and, based on those evaluation values, determines which of the first axis and the second axis is advantageous for the movement of the specific part in the determination target section (Step S306).

The first axis determining unit 316 refers to the movement vectors calculated by the calculating unit 104 and accordingly determines the advantageous direction along the first axis (Step S307).

Similarly, the second axis determining unit 318 refers to the movement vectors calculated by the calculating unit 104 and accordingly determines the advantageous direction along the second axis (Step S308).

Then, from the determination results regarding the first axis and the second axis, the determination result selecting unit 320 selects the determination result of the axis that is determined by the determining unit 312 to be advantageous for the movement of the specific part in a determination target section (Step S310).

Every time the obtaining unit 102 obtains the latest position of the specific part of the photographic subject (Step S301), the operations from Step S302 to Step S310 are repeated, and the presenting unit 314 performs presentation according to the determination result of the determination result selecting unit 320.

Explained below is an exemplary sequence of operations performed by the determining unit 312. The sequence of operations performed by the determining unit 312 is a combination of the flowchart illustrated in FIG. 10 and the flowchart illustrated in FIG. 20. More particularly, in the flowchart illustrated in FIG. 10, when the evaluation value $E_c$ is not equal to or smaller than the evaluation value $E_b$ (No at Step S131), the system control proceeds not to Step S133 but to Step S241 illustrated in the flowchart in FIG. 20.

Figure 26:
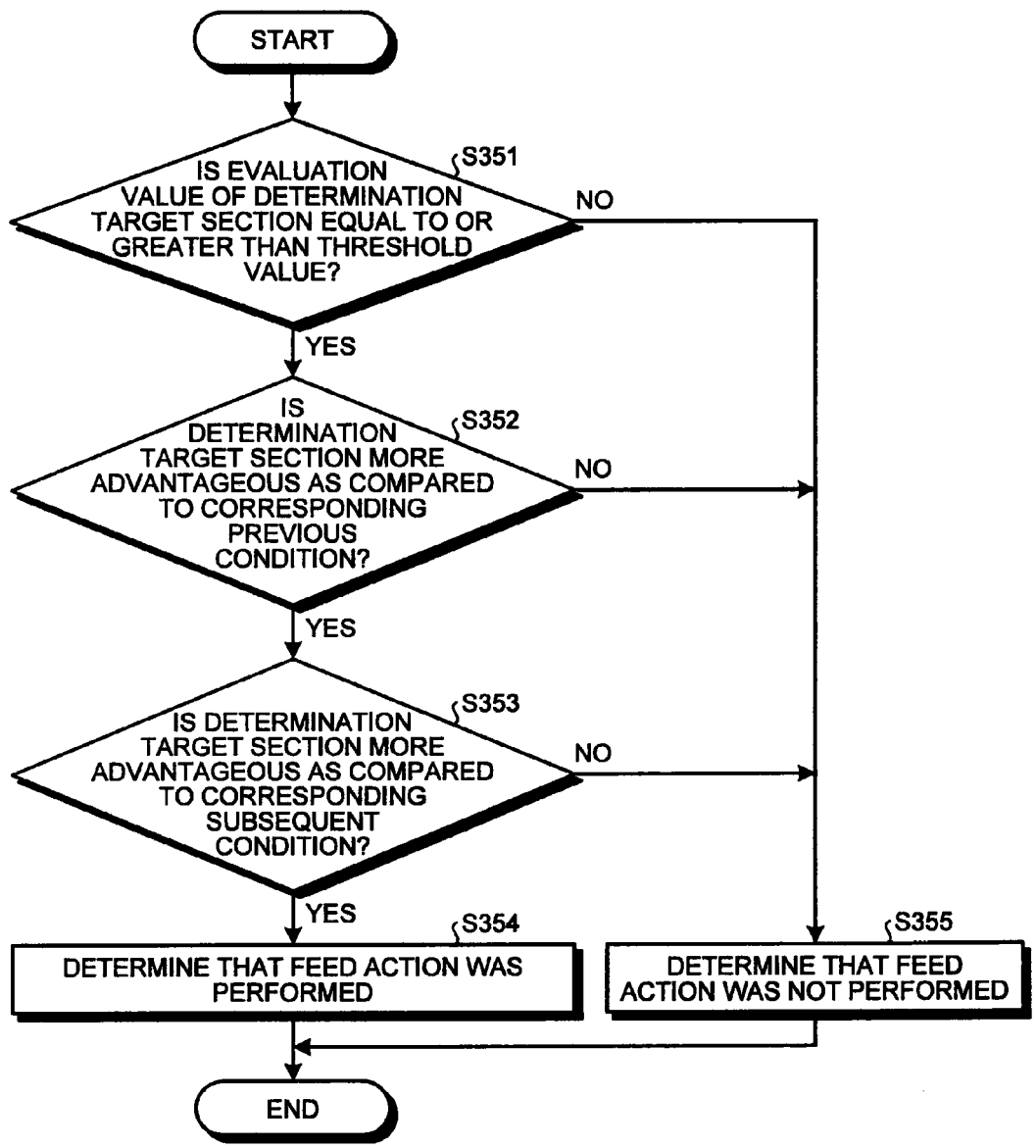
FIG. 26 is a flowchart for explaining an exemplary sequence of operations performed by a second axis determining unit in the recognition apparatus according to the third embodiment.

FIG. 26 is a flowchart for explaining an exemplary sequence of operations performed by the second axis determining unit 318 in the recognition apparatus 300 according to the third embodiment. Herein, although not explained, the same sequence of operations is also performed by the first axis determining unit 316. Moreover, the explanation with reference to FIG. 26 is given for a case when the determination of whether or not a feed action was performed in an operation section is done in real time.

Firstly, as a determination target section, the second axis determining unit 318 sets an operation section in which a start point is either set to a second-axis direction turning point when such a second-axis direction turning point is present at which the direction along the second axis component of the movement vector changes, or set to the initial point indicating the initially-obtained position when a second-axis direction turning point is absent; and in which an end point is set to the latest point that indicates the most-recently obtained position. Then, the second axis determining unit 318 calculates an evaluation value of the operation section and checks whether or not the evaluation is equal to or greater than a threshold value (Step S351).

If the evaluation value of the operation section is equal to or greater than a threshold value (Yes at Step S351), then the second axis determining unit 318 checks whether or not the operation section is more advantageous as compared to the previous condition (Step S352). More particularly, the second axis determining unit 318 sets a previous section in which an end point is set to the start point of the operation section and in which a start point is either set to a second-axis direction turning point present immediately before the end point, when the second-axis direction turning points are present before the end point, or set to the initial point when a second-axis direction turning point is not present before the end point. Then, the second axis determining unit 318 calculates an evaluation value of the previous section and checks whether or not the evaluation value of the operation section is exceeding the evaluation value of the previous section.

When the operation section is more advantageous as compared to the corresponding previous condition (Yes at Step S352), that is, when the evaluation value of the operation section is exceeding the evaluation value of the corresponding previous section; the second axis determining unit 318 checks whether the operation section is more advantageous as compared to the subsequent condition (Step S353). More particularly, the second axis determining unit 318 updates the end point either to the second-axis direction turning point present immediately after the start point of the operation section, when such a second-axis direction turning point is present immediately after the start point of the operation section before the elapse in a predetermined time period since the setting of the operation section, or to the latest point that indicates the most-recently obtained position after the elapse in a predetermined time period, when no second-axis direction turning point is present immediately after the start point of the operation section before the elapse in the predetermined time. Moreover, the second axis determining unit 318 sets a subsequent section, in which a start point is set to the end point of the updated operation section and in which an end point is either set to the second-axis direction turning point subsequent to the start point when such a second-axis direction turning point is present subsequent to the start point or set to the latest point present after the elapse in a predetermined time period when latest points are present subsequent to the start point. Then, the second axis determining unit 318 calculates an evaluation value of the subsequent section and checks whether or not the evaluation value of the operation section is exceeding the evaluation value of the subsequent section.

When the operation section is more advantageous as compared to the corresponding subsequent condition (Yes at Step S353), that is, when the evaluation value of the operation section is exceeding the evaluation value of the corresponding subsequent section; the second axis determining unit 318 determines that a feed action in the direction of the movement vectors in the second axis was performed in the operation section (Step S354).

On the other hand, when the evaluation value of the operation section is smaller than the threshold value (No at Step S351) or when the operation section is not advantageous as compared to the previous condition (No at Step S352) or when the operation section is not advantageous as compared to the subsequent condition (No at Step S353); the second axis determining unit 318 determines that the action performed in the operation section was not a feed action (Step S355).

As described above, in the third embodiment, the gesture in a determination target section is recognized using the corresponding previous section and the corresponding subsequent section. Thus, according to the third embodiment, it becomes possible to determine whether or not the gesture in a determination target section is noise. Because of that, even if a movement representing noise is included in a gesture, such movement can be recognized correctly thereby enabling prevention of a decline in the recognition accuracy. For example, even if a movement representing noise is included at the start and at the end of a gesture, such movement can be recognized correctly. Moreover, according to the third embodiment, it is also possible to recognize the direction indicated along each axis.

Fourth Embodiment

In the first to third embodiments described above, the explanation is given for a case in which two axes are included in the coordinate system representing the positions of a specific part of a photographic subject. That is, there are two axes that are considered to be the determination targets for the gestures performed by the specific part. In a fourth embodiment, the explanation is given for a case in which three or more axes are included in the coordinate system representing the positions of a specific part of a photographic subject. Herein, it is assumed that the axes intersect with each other at a single point.

Figure 27:
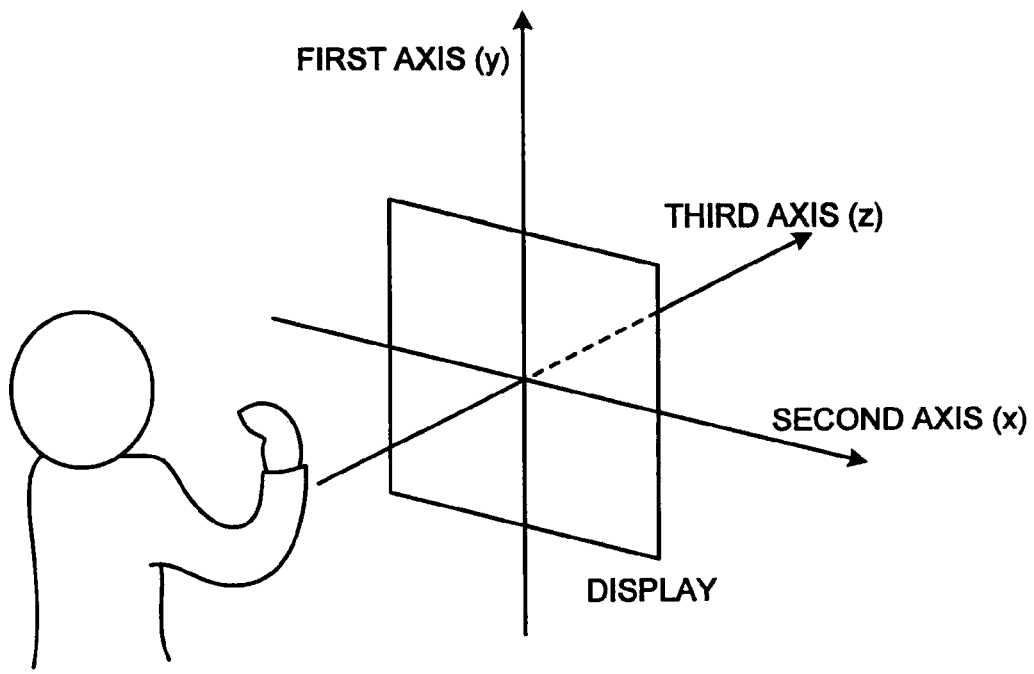
FIG. 27 is a diagram illustrating an exemplary coordinate system according to a fourth embodiment.

FIG. 27 is a diagram illustrating an exemplary coordinate system according to the fourth embodiment. In the coordinate system illustrated in the example in FIG. 27, a first axis to a third axis are set corresponding to mutually independent directions of x, y, and z, respectively that define a three-dimensional space. Hence, determination of gestures can be performed in the up-down direction, the left-right direction, and the front-back direction.

Figure 28:
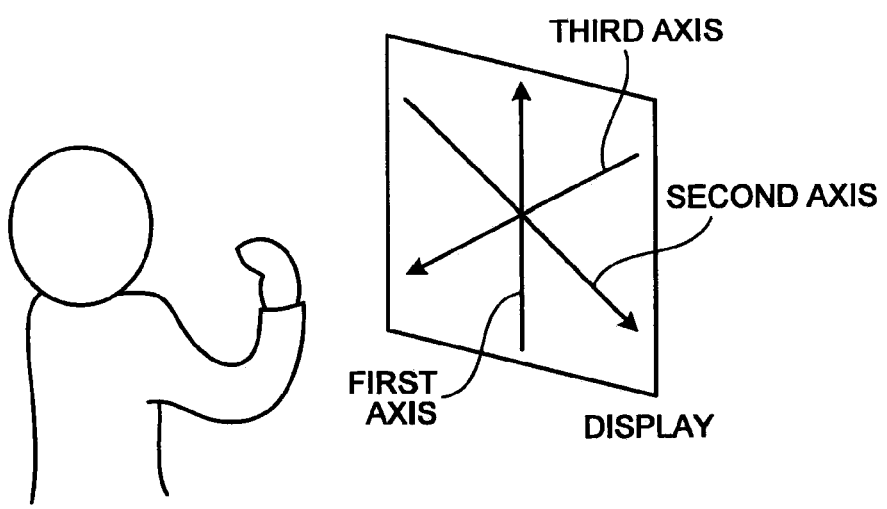
FIG. 28 is a diagram illustrating another exemplary coordinate system according to the fourth embodiment.

FIG. 28 is a diagram illustrating another exemplary coordinate system according to the fourth embodiment. In the coordinate system illustrated in FIG. 28, it is possible to set the axes corresponding to three different directions on the same plane (for example, three axes rotated by 120° from each other on the same plane).

The principal axis selecting unit 106 calculates, for each movement vector that is calculated, a first inner product that is the inner product of the movement vector and the first axis, a second inner product that is the inner product of the movement vector and the second axis, and a third inner product that is the inner product of the movement vector and the third axis. Then, of the first to third axes, the principal axis selecting unit 106 selects the axis that is used in calculating the inner product having the greatest modulus, from among the first inner product to the third inner product, as the principal axis.

Consider the case when more than one inner product has the greatest modulus. In that case, if the axes that are used in calculating the inner products having the greatest modulus include the previous principal axis, then the principal axis selecting unit 106 selects the previous principal axis as the current principal axis. On the other hand, if the axes that are used in calculating the inner products having the greatest modulus do not include the previous principal axis, then the principal axis selecting unit 106 selects, as the principal axis, an arbitrary axis from among the axes that are used in calculating the inner products having the greatest modulus.

Application

Explained below are exemplary applications of the recognition apparatus according to the embodiments described above. The applications explained below are only exemplary, and the recognition apparatus can also be implemented in other devices.

First Application

Figure 29:
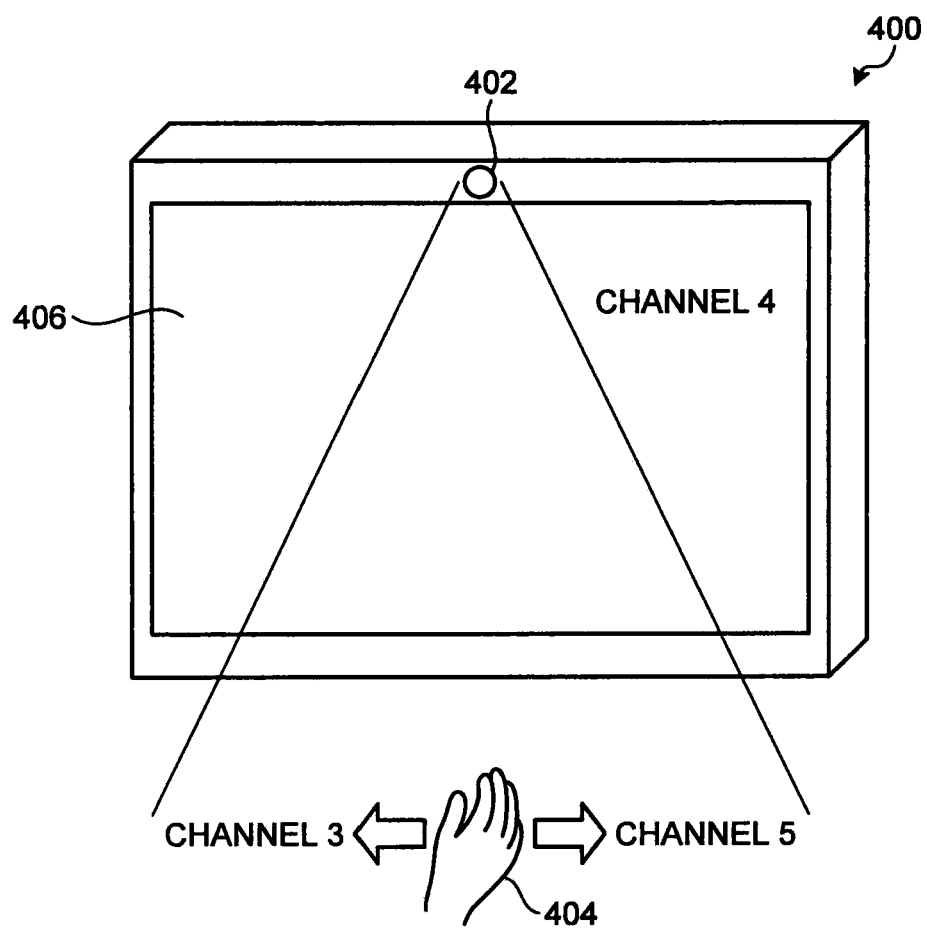
FIG. 29 is a diagram illustrating a television receiver according to a first application.

FIG. 29 is a diagram illustrating a television receiver 400 according to a first application. In the television receiver 400 illustrated in FIG. 29, the recognition apparatus according to any one of the embodiments described above is implemented, and the channel operations are performed via gestures.

The television receiver 400 has a camera 402 installed therein for capturing images of the viewer. As the specific part, the television receiver 400 detects and follows a hand 404 of the viewer in order to recognize feed actions. It is illustrated that a television screen 406 is currently displaying a channel 4. When the viewer performs a feed action of swiftly moving the hand 404 leftward, the channel can be changed to a channel 3. Similarly, when the viewer performs a feed action of swiftly moving the hand 404 rightward, the channel can be changed to a channel 5.

Second Application

Figure 30:
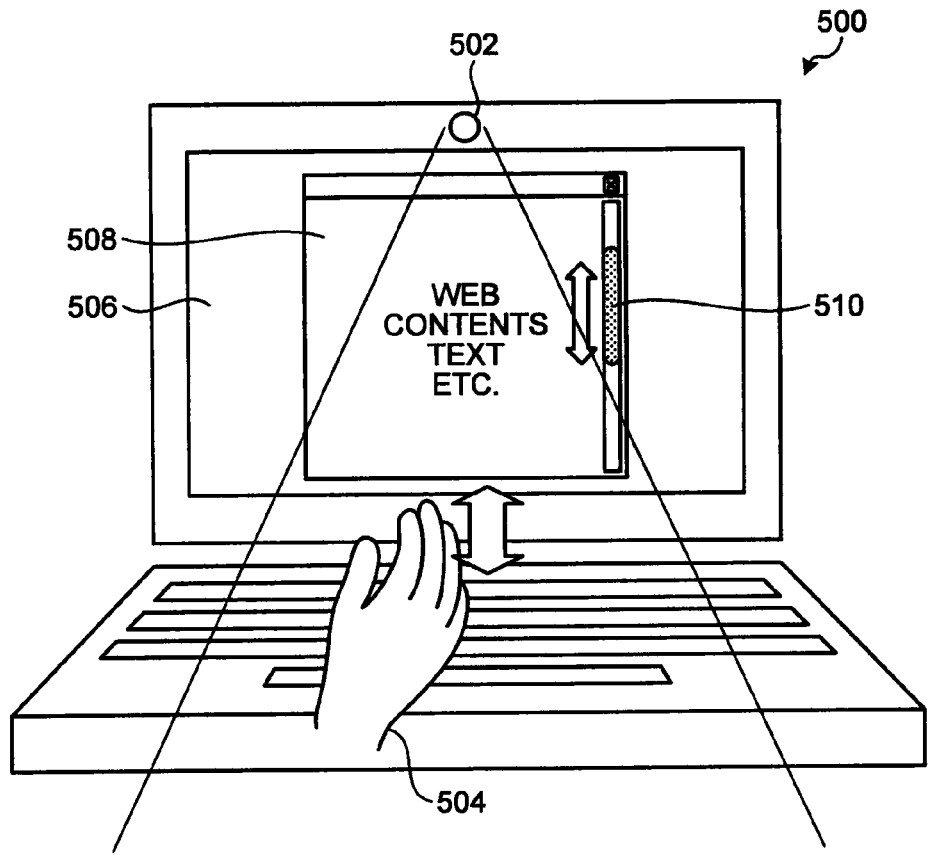
FIG. 30 is a diagram illustrating a personal computer according to a second application.

FIG. 30 is a diagram illustrating a personal computer 500 according to a second application. In the personal computer 500 illustrated in FIG. 30, the recognition apparatus according to any one of the embodiments described above is implemented. Herein, the web contents or the text displayed in a window 508 on a screen 506 can be scrolled via gestures of a hand 504.

The personal computer 500 has a camera 502 installed therein for capturing images of the user. As the specific part, the personal computer 500 detects and follows the hand 504 of the user in order to recognize feed actions. Then, in the direction of the feed action that has been detected, the personal computer 500 issues a scroll command for scrolling in that direction. At that time, the amount of scrolling, which is displayed on a scroll bar 510, can be set to a predetermined constant amount. Alternatively, the amount of scrolling can be changed depending on the speed of the feed action. For example, faster the feed action, greater can be the amount of scrolling.

As a result, the user can scroll the contents, which are displayed in the window 508, in the direction of the feed action and thus browse the web contents or the text.

Third Embodiment

Figure 31:
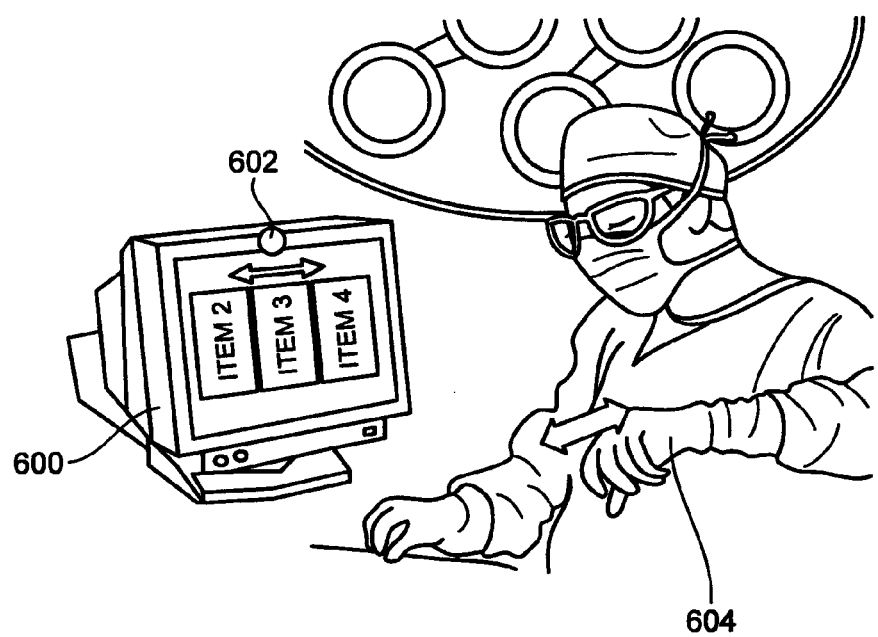
FIG. 31 is a diagram illustrating a medical information terminal according to a third application.

FIG. 31 is a diagram illustrating a medical information terminal 600 according to a third application. In the medical information terminal 600 illustrated in FIG. 31, the recognition apparatus according to any one of the embodiments described above is implemented. The medical information terminal 600 is used in providing information to a doctor who is performing a surgery.

Since the doctor who is performing a surgery has to keep a hand 604 clean, it is not possible to use the hand 604 to directly operate the medical information terminal 600, which provides information such as the monitoring information or the laboratory results of the patient.

For that reason, by implementing the recognition apparatus according to any one of the embodiments described above in the medical information terminal 600, it becomes possible for the doctor to operate the medical information terminal 600 in a contactless manner via gestures of the hand 604.

The medical information terminal 600 has a camera 602 installed therein for capturing images of the doctor. As the specific part, the medical information terminal 600 detects and follows the hand 604 of the doctor in order to recognize feed actions. Then, in the direction of the feed action that has been detected, the medical information terminal 600 issues a scroll command for scrolling in that direction or issues a change command for changing the display information.

Modification Example

The invention is not limited to the embodiments described above and it is possible to implement various modifications within the scope of the invention.

For example, the first embodiment and the second embodiment can be combined together. In that case, the section setting unit, the determining unit, and the presenting unit perform operations identical to the operations described in the third embodiment. Moreover, in the third embodiment, although the section setting unit 310 sets previous sections as well as subsequent sections with respect to determination target sections, the section setting unit 310 can alternatively be configured to set either previous sections or subsequent sections as described in the first embodiment or in the second embodiment.

As described above, the television receiver 400, the personal computer 500, and the medical information terminal 600 are explained as applications of the recognition apparatus. Besides, the recognition apparatus can also be implemented in other devices such as game consoles. That is, the recognition apparatus can also be implemented in devices that enable the user to perform feed actions regarding device control menus or feed actions regarding displayed contents with the use of gesture interfaces provided for easy device operations without having to hold or wear remote controllers, sensors, markers, or the like.

Meanwhile, the recognition apparatus according to each embodiment and each modification example described above has the hardware configuration of a commonly-used computer that includes a control device such as a central processing unit (CPU), a memory device such as a read only memory (ROM) or a random access memory (RAM), an external memory device such as a hard disk drive (HDD) or a solid state drive (SSD), a display device such as a display, an input device such as a mouse or a keyboard, and a communication device such as a communication interface (I/F).

Meanwhile, a recognition program, which is executed in the recognition apparatus according to each embodiment and each modification example described above, can be provided in the form of an installable or executable file on a computer-readable recording medium such as a compact disk read only memory (CD-ROM), a compact disk recordable (CD-R), a digital versatile disk (DVD), or a flexible disk (FD).

Alternatively, the recognition program, which is executed in the recognition apparatus according to each embodiment and each modification example described above, can be saved on a computer connected to a network and downloaded from that computer via the network. Still alternatively, the recognition program, which is executed in the recognition apparatus according to each embodiment and each modification example described above, can be made available for distribution through the network such as the Internet. Still alternatively, the recognition program, which is executed in the recognition apparatus according to each embodiment and each modification example described above, can be stored in advance in a ROM or the like.

Herein, the recognition program, which is executed in the recognition apparatus according to each embodiment and each modification example described above, contains modules for implementing the functions of the abovementioned constituent elements in a computer. Regarding the actual hardware, a CPU retrieves the recognition program from, for example, an HDD and runs it so that the recognition program is loaded in a RAM. As a result, the functions of the abovementioned constituent elements are implemented in the RAM.

In this way, according to an aspect of the invention, it becomes possible to prevent a decline in the recognition accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recognition apparatus comprising:
an obtaining unit configured to obtain, in chronological order, positions of a specific part of a photographic subject that are represented in a coordinate system having a first axis to an n-th axis (n≥2);
a calculating unit configured to calculate a movement vector of the specific part at each of the positions obtained in chronological order;
a principal axis selecting unit configured to
 calculate, for each of the movement vectors that has been calculated, a first inner product that is an inner product of the movement vector and the first axis to an n-th inner product that is an inner product of the movement vector and the n-th axis, and
 select, as a principal axis, an axis that is used in calculating the inner product, from among the first inner product to the n-th inner product, having the greatest modulus;
a turning point setting unit configured to
 set a position at which there is a change in the principal axis as a principal axis turning point and a direction turning point, and
 set a position at which there is a change in the direction of any of the movement vectors in the principal axis component as the direction turning point;
a section setting unit configured to
 set a determination target section, in which a start point is either set to the latest principal axis turning point when the principal axis turning points are present or set to an initial point indicating the initially-obtained position when the principal axis turning points are absent, and in which an end point is set to a latest point that indicates the most-recently obtained position,
 set a previous section, in which an end point is set to the start point of the determination target section and in which a start point is either set to a direction turning point present immediately before the end point when the direction turning points are present before the end point or set to the initial point when the direction turning points are not present immediately before the end point;

a determining unit configured to
  calculate an evaluation value of the determination target section and an evaluation value of the immediately previous section and,
  based on the evaluation value of the determination target section and the evaluation value of the previous section, determine which of the first axis to the n-th axis is advantageous for movement of the specific part in the determination target section; and a presenting unit configured to perform presentation according to a determination result obtained by the determining unit.

2. The apparatus according to claim 1, wherein
when the evaluation value of the determination target section is exceeding the evaluation value of the previous section or when the previous section is not present, the determining unit determines that the principal axis in the determination target section is advantageous for movement of the specific part in the determination target section, and
when the evaluation value of the determination target section is equal to or smaller than the evaluation value of the previous section, the determining unit determines that the principal axis in the previous section is advantageous for movement of the specific part in the determination target section.

3. The apparatus according to claim 1, wherein the principal axis selecting unit performs correction in a form of increasing an inner product, from among the first inner product to the n-th inner product, which is calculated using the principal axis of the movement vector calculated at the previous time.

4. The apparatus according to claim 1, wherein
the evaluation value points to at least one of an amount of change in position or size of the specific part, a velocity of change in position or size of the specific part, and an acceleration of change in position or size of the specific part.

5. A recognition method comprising:
obtaining, by an obtaining unit, in chronological order, positions of a specific part of a photographic subject that are represented in a coordinate system having a first axis to an n-th axis (n≥2);
calculating, by a calculating unit, a movement vector of the specific part at each of the positions obtained in chronological order;
principal-axis-selecting, by a principal axis selecting unit, that
  includes calculating, for each of the movement vectors that has been calculated, a first inner product that is an inner product of the movement vector and the first axis to an n-th inner product that is an inner product of the movement vector and the n-th axis, and
  includes selecting, as a principal axis, an axis that is used in calculating the inner product, from among the first inner product to the n-th inner product, having the greatest modulus;
turning-point-setting, by a turning point setting unit, that
  includes setting a position at which there is a change in the principal axis as a principal axis turning point and a direction turning point, and
  includes setting a position at which there is a change in the direction of any of the movement vectors in the principal axis component as the direction turning point;
section-setting, by a section setting unit, that
  includes setting a determination target section, in which a start point is either set to the latest principal axis turning point when the principal axis turning points are present or set to an initial point indicating the initially-obtained position when the principal axis turning points are absent, and in which an end point is set to a latest point that indicates the most-recently obtained position, and
  includes setting a previous section, in which an end point is set to the start point of the determination target section and in which a start point is either set to a direction turning point that is present immediately before the end point when the direction turning points are present before the end point or set to the initial point when the direction turning points are not present immediately before the end point;
determining, by a determining unit, that
  includes calculating an evaluation value of the determination target section and an evaluation value of the previous section, and
  includes determining, based on the evaluation value of the determination target section and the evaluation value of the previous section, which of the first axis to the n-th axis is advantageous for movement of the specific part in the determination target section; and
presenting, by a presenting unit, that includes performing presentation according to a determination result obtained at the determining.

6. A computer program product having a non-transitory computer-readable medium including programmed instructions, wherein the instructions, when executed by a computer, cause the computer to execute:
obtaining, in chronological order, positions of a specific part of a photographic subject that are represented in a coordinate system having a first axis to an n-th axis (n≥2);
calculating a movement vector of the specific part at each of the positions obtained in chronological order;
principal-axis-selecting that includes calculating, for each of the movement vectors that has been calculated, a first inner product that is an inner product of the movement vector and the first axis to an n-th inner product that is an inner product of the movement vector and the n-th axis, and includes selecting, as a principal axis, an axis that is used in calculating the inner product, from among the first inner product to the n-th inner product, having the greatest modulus;
turning-point-setting that includes setting a position at which there is a change in the principal axis as a principal axis turning point and a direction turning point, and includes setting a position at which there is a change in the direction of any of the movement vectors in the principal axis component as the direction turning point;
section-setting that includes setting a determination target section, in which a start point is either set to the latest principal axis turning point when the principal axis turning points are present or set to an initial point indicating the initially-obtained position when the principal axis turning points are absent, and in which an end point is set to a latest point that indicates the most-recently obtained position, and includes setting a previous section, in which an end point is set to the start point of the determination target section and in which a start point is either set to a direction turning point that is present immediately before the end point when the direction turning points are present before the end point or set to the initial point when the direction turning points are not present immediately before the end point;

determining that includes calculating an evaluation value of the determination target section and an evaluation value of the previous section, and includes determining, based on the evaluation value of the determination target section and the evaluation value of the previous section, which of the first axis to the n-th axis is advantageous for movement of the specific part in the determination target section; and presenting that includes performing presentation according to a determination result obtained at the determining.

* * * * *